United States Patent
Li et al.

(10) Patent No.: US 10,608,806 B2
(45) Date of Patent: Mar. 31, 2020

(54) SHORT TTI WITHIN SPECIAL SUBFRAMES OF TTD COMMUNICATION SYSTEMS

(71) Applicant: Telefonaktiebolaget LM Ericsson (publ), Stockholm (SE)

(72) Inventors: Jingya Li, Göteborg (SE); Mattias Andersson, Sundbyberg (SE); Niklas Andgart, Södra Sandby (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/068,543

(22) PCT Filed: Mar. 2, 2017

(86) PCT No.: PCT/SE2017/050197
§ 371 (c)(1),
(2) Date: Jul. 6, 2018

(87) PCT Pub. No.: WO2017/151048
PCT Pub. Date: Sep. 8, 2017

(65) Prior Publication Data
US 2019/0044692 A1  Feb. 7, 2019

Related U.S. Application Data

(60) Provisional application No. 62/303,947, filed on Mar. 4, 2016.

(51) Int. Cl.
*H04L 5/14* (2006.01)
*H04L 1/00* (2006.01)
(Continued)

(52) U.S. Cl.
CPC ......... *H04L 5/1469* (2013.01); *H04B 7/2656* (2013.01); *H04L 1/0007* (2013.01);
(Continued)

(58) Field of Classification Search
CPC ... H04L 1/1887; H04L 5/0092; H04L 5/1469; H04L 1/0007; H04L 5/14; H04L 1/00;
(Continued)

(56) References Cited

U.S. PATENT DOCUMENTS 10,361,836 B2 *  7/2019  Lee .......................... H04L 5/001
10,367,630 B2 *  7/2019  Byun ................. H04W 72/0446
(Continued)

OTHER PUBLICATIONS

International Search Report and Written Opinion dated May 30, 2017 for International Application No. PCT/SE2017/050197 filed on Mar. 2, 2017, consisting of 12-pages.
(Continued)

*Primary Examiner* — Man U Phan
(74) *Attorney, Agent, or Firm* — Sage Patent Group

(57) ABSTRACT

A wireless device, network node and method for communication between wireless devices and network nodes are provided. According to one aspect, a wireless device configured to communicate with a network node in a wireless communication system is provided. The wireless device includes processing circuitry configured to form at least one of an uplink, UL, signal and a downlink, DL, signal during at least one short transmission time interval, sTTI, in a special sub-frame of a radio frame to create an sTTI-containing special subframe. The wireless device further includes a transceiver configured to communicate with the network node by one of sending the uplink signal and receiving the downlink signal during the at least one sTTI.

29 Claims, 11 Drawing Sheets

(51) Int. Cl.
*H04W 72/04* (2009.01)
*H04L 5/00* (2006.01)
*H04B 7/26* (2006.01)
*H04L 1/18* (2006.01)

(52) U.S. Cl.
CPC ......... *H04L 1/1887* (2013.01); *H04L 5/0092* (2013.01); *H04W 72/042* (2013.01); *H04W 72/0446* (2013.01)

(58) Field of Classification Search
CPC .. H04L 1/18; H04W 72/042; H04W 72/0446; H04W 72/04; H04W 72/14; H04B 7/2656
USPC .......................................................... 370/280
See application file for complete search history.

(56) References Cited

U.S. PATENT DOCUMENTS

| | | | |
|---|---|---|---|
| 2015/0117270 A1 | 4/2015 | Um et al. | |
| 2018/0041325 A1* | 2/2018 | Lee | H04L 1/00 |
| 2018/0049165 A1* | 2/2018 | Byun | H04W 72/0446 |
| 2018/0199322 A1* | 7/2018 | Takeda | H04J 11/00 |
| 2018/0255543 A1* | 9/2018 | Takeda | H04B 1/713 |
| 2018/0324834 A1* | 11/2018 | Sebire | H04L 5/14 |
| 2018/0359745 A1* | 12/2018 | Yeo | H04L 1/18 |
| 2019/0007943 A1* | 1/2019 | Takeda | H04L 1/1861 |
| 2019/0036676 A1* | 1/2019 | Takeda | H04W 72/04 |
| 2019/0045394 A1* | 2/2019 | Takano | H04W 72/042 |
| 2019/0069312 A1* | 2/2019 | Oh | H04W 72/04 |

OTHER PUBLICATIONS

3GPP TSG-RAN WG1 Meeting #84, R1-160780, Title: Considerations on shorter TTI for TDD duplex mode; Agenda Item: 7.3.4.4; Source: Nokia Networks, Alcatel-Lucent, Alcatel-Lucent Shanghai Bell; Document for: Discussion and Decision; Location and Date: St. Julian's Malta, Feb. 15-19, 2016, consisting of 4-pages.

3GPP TSG RAN WG1 #84, R1-160739, Title: System Analysis of UL TTI Shortening; Agenda Item: 7.3.4.3; Source: CATT; Document for: Discussion and Decision; Location and Date: Malta, Feb. 15-19, 2016, consisting of 6-pages.

3GPP TS 36.211 V13.0.0; 3rd Generation Partnership Project; Technical Specification Group Radio Access Network; Evolved Universal Terrestrial Radio Access (E-UTRA); Physical channels and modulation (Release 13); Dec. 2015, consisting of 141-pages.

* cited by examiner

SHORT TTI WITHIN SPECIAL SUBFRAMES OF TTD COMMUNICATION SYSTEMS

CROSS-REFERENCE TO RELATED APPLICATIONS

This application is a Submission Under 35 U.S.C. § 371 for U.S. National Stage Patent Application of International Application No.: PCT/SE2017/050197, filed Mar. 2, 2017 entitled "SHORT TTI WITHIN SPECIAL SUBFRAMES OF TTD COMMUNICATION SYSTEMS," which claims priority to U.S. Provisional Application No. 62/303,947, filed Mar. 4, 2016, entitled "SHORT TRANSMISSION TIME INTERVAL IN TIME DIVISION DUPLEX SPECIAL SUBFRAMES," the entireties of both of which are incorporated herein by reference.

TECHNICAL FIELD

This disclosure relates to wireless communication and in particular, to introducing short transmission time intervals in time division duplex special subframes.

BACKGROUND

A new available large spectrum block for fourth generation (4G) evolution radio systems and fifth generation (5G) radio systems is expected to be taken from a higher frequency band (e.g. above third generation (3G) radio systems) with most of the available spectrum unpaired. Time division duplex (TDD is promising for spectrum in the higher frequency band due to no requirement for a paired frequency band, channel reciprocity for MIMO and cost-effectiveness. 4G evolution should aim to enable higher performance, such as higher data rate and lower latency, which requires continued improvement for TDD.

In the 3rd Generation Partnership Project (3GPP) TS 36.211 standard, three radio frame structures are supported. Frame structure type 1 (FS 1) is applicable to frequency division duplex (FDD) only, frame structure type 2 (FS 2) is applicable to time division duplex (TDD) only, and frame structure type 3 (FS 3) is applicable to licensed assisted access (LAA) secondary cell operation only.

With FS 2 for TDD, each radio frame of length 10 ms consists of two half-frames of length 5 ms each. Each half-frame consists of five subframes (SFs) of length 1 ms. Each subframe (SF) is defined by two slots of length 0.5 ms each. Within each radio frame, a subset of SFs is reserved for uplink (UL) transmissions, and the remaining SFs are allocated for downlink (DL) transmissions, or for special SFs, where the switch from DL to UL occurs. Downlink refers to transmissions from a network node, such as a base station, to a wireless device, such as a mobile phone. Uplink refers to transmissions from the wireless device to the network node.

As shown in Table 1, copied from the third generation partnership project (3GPP) standard, 3GPP TS 36.211, version 13.0.0, seven different DL/UL configurations are supported for frame structure 2 (FS 2). In Table 1, "D" denotes a DL SF, "U" denotes an UL SF, and "S" represents a special SF. Configurations 0, 1, 2, and 6 have 5 ms DL-to-UL switch-point periodicity, with the special SF existing in both SF 1 and SF 6. Configurations 3, 4 and 5 have 10 ms DL-to-UL switch-point periodicity, with the special SF in SF 1 only.

TABLE 1

| DL/UL Configuration | DL-to-UL Switch-point periodicity | SF number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A special SF is split into three parts: a DL part (DwPTS), GP (Guard Period) and an UL part (UpPTS). The DwPTS with a duration more than 3 symbols can be treated as a normal DL SF for data transmission. However, the UpPTS is not used for data transmission due to the very short duration. Instead, UpPTS can be used for channel sounding or random access. In 3GPP TS 36.211, version 13.0.0, a set of DwPTS/GP/UpPTS configurations (lengths of DwPTS/GP/UpPTS in symbols) is supported as shown in Table 2. In Table 2, CP refers to the cyclic prefix. Table 2 shows the lengths of DwPTS and UpPTS in symbols.

TABLE 2

| Special SF configuration | Normal CP for DL and UL | | | Extended CP for DL and UL | | |
|---|---|---|---|---|---|---|
| | DwPTS | GP | UpPTS | DwPTS | GP | UpPTS |
| 0 | 3 | 10 | 1 | 3 | 8 | 1 |
| 1 | 9 | 4 | 1 | 9 | 2 | 1 |
| 2 | 10 | 3 | 1 | 10 | 1 | 1 |
| 3 | 11 | 2 | 1 | 11 | 0 | 1 |
| 4 | 12 | 1 | 1 | 3 | 7 | 2 |
| 5 | 3 | 9 | 2 | 9 | 1 | 2 |
| 6 | 9 | 3 | 2 | 10 | 0 | 2 |
| 7 | 10 | 2 | 2 | 5 | 5 | 2 |
| 8 | 11 | 1 | 2 | | | |
| 9 | 6 | 6 | 2 | | | |

Typically, the DL/UL configuration and the configuration of the special SF used in a cell are signaled as part of the system information, which is included in a system-information block 1 (SIB1) and broadcasted every 80 ms within SF 5. The DL/UL configuration in a cell may vary between frames to adapt to the traffic needs.

Packet data latency is one of the performance metrics that vendors, operators and end-users (via speed test applications) regularly measure. Latency measurements are done in all phases of a radio access network system lifetime, when verifying a new software release or system component, when deploying a system and when the system is in commercial operation. The latency is determined by several factors with two of them related to TDD frame structure, frame alignment and hybrid automated repeat request (HARQ) round trip time (RTT). An enhanced LTE-TDD frame structure can provide better frame alignment for shorter TTI and shorten the HARQ RTT.

Due to the existing frame structure design, the HARQ RTT is long in existing TDD systems, because downlink HARQ-ACK feedback can be performed only in an uplink subframe and uplink HARQ-ACK feedback can be performed only in a downlink subframe and DwPTS symbols of a special subframe.

Shorter latency than previous generations of 3GPP radio access technologies (RATs) was one performance metric that guided the design of Long Term Evolution (LTE). LTE is also now recognized by end-users to be a system that provides faster access to the Internet and lower data latencies than previous generations of mobile radio technologies.

Packet data latency is important not only for the perceived responsiveness of the system, it is also a parameter that indirectly influences the throughput of the system. Hypertext transfer protocol/transmission control protocol (HTTP/TCP) is the dominating application and transport layer protocol suite used on the Internet today. According to HTTP Archive (http://httparchive.org/trends.php) the typical size of HTTP based transactions over the Internet are in the range of a few 10 s of Kbytes up to 1 Mbyte. In this size range, the TCP slow start period is a significant part of the total transport period of the packet stream. During TCP slow start, the performance is latency limited. Hence, improved latency can improve the average throughput for these types of TCP-based data transactions.

Radio resource efficiency could be positively impacted by latency reductions. Lower packet data latency could increase the number of transmissions possible within a certain delay bound; hence higher Block Error Rate (BLER) targets could be used for the data transmissions freeing up radio resources, potentially improving the capacity of the system.

One area to address when it comes to packet latency reductions is the reduction of transport time of data and control signaling, by addressing the length of a transmission time interval (TTI). In LTE release 8, a TTI corresponds to one SF of length 1 millisecond. One such 1 ms TTI is constructed by using 14 orthogonal frequency division multiplex (OFDM) or single carrier frequency division multiple access (SC-FDMA) symbols in the case of normal cyclic prefix and 12 OFDM or SC-FDMA symbols in the case of extended cyclic prefix. In LTE release 13, a study item has the goal of specifying transmissions with TTIs that are much shorter than the LTE release 8 TTI.

The short TTI is defined to have any duration in time and comprise resources on a number of OFDM or SC-FDMA symbols within a 1 ms SF. As one example, the duration of the short TTI may be 0.5 ms, i.e., seven OFDM or SC-FDMA symbols for the case with normal cyclic prefix. Another example is a TTI of only two OFDM or SC-FDMA symbols.

Based on the existing FS 2, as given in 3GPP TS 36.211, UL data and control information may only be transmitted in UL SF, and downlink transmission is only possible in DL SF and DwPTS of the special SF. Therefore, the delay for a granted UL data transmission will depend on when the next UL SF occurs, and the delay for a granted DL data transmission will depend on when the next DL SF or DwPTS occurs. The latency will thus depend on the frame alignment in TDD. The hybrid automated repeat request (HARQ) timing for UL and DL transmissions also depends on the DL/UL configurations, which in turn has an impact on HARQ round-trip-time (RTT).

Based on the existing FS 2, the latency due to frame alignment and HARQ RTT for TDD is much longer than that for frequency division duplex (FDD). Even with shortened TTIs, the latency in TDD cannot be scaled linearly proportional to the TTI length, and it is limited to the additional waiting time due to the DL/UL configurations.

SUMMARY

Some embodiments advantageously provide a wireless device, network node and method for communication between wireless devices and network nodes. According to one aspect, a wireless device configured to communicate with a network node in a wireless communication system is provided. The wireless device includes processing circuitry configured to obtain information regarding inclusion of at least one of an uplink, UL, signal and a downlink, DL, signal during at least one short transmission time interval, sTTI, in a special subframe of a radio frame to create an sTTI-containing special subframe. The wireless device further includes a transceiver configured to communicate with the network node by one of sending the uplink signal and receiving the downlink signal during the at least one sTTI.

According to this aspect, in some embodiments, the at least one sTTI is of two symbols duration. In some embodiments, the at least one sTTI at least partly occupies at least one symbol of a guard period, GP, of the special subframe. In some embodiments, the GP of the sTTI-containing special subframe occupies fewer symbols than a GP of a special subframe not having any sTTIs. In some embodiments, the at least one sTTI occurs in one of: symbols covering both a downlink part, DwPTS, and a guard period, GP, of the special subframe; and symbols covering both a GP and an uplink part, UpPTS, of the special subframe. In some embodiments, at least one symbol of a downlink part, DwPTS, of the special subframe is used as a guard period, GP, for the sTTI-containing special subframe and at least one UL sTTI occupies at least one symbol of a GP of the special subframe. In some embodiments, a physical downlink control channel, PDCCH is configured to be of shorter duration than the duration of the DwPTS. In some embodiments, at least one symbol of an uplink part, UpPTS, in the special subframe is used as a guard period, GP, in the sTTI-containing subframe and at least one DL sTTI occupies at least one symbol of the GP of the special subframe. In some embodiments, no wireless device is granted transmission of sounding reference signals, SRS, and no physical random access channel, PRACH, is allocated in the special subframe. In some embodiments, multiple switches between UL and DL are supported for sTTIs in the sTTI-containing special subframe. In some embodiments, the special subframe has a downlink part, DwPTS, of at least three symbols duration, a guard period of at least nine symbols duration, and an uplink part, UpPTS, of at least one symbol duration. In some embodiments, the special subframe has a downlink part, DwPTS, of at least eight symbols duration, a guard period of at least three symbols duration, and an uplink part, UpPTS, of at least one symbol duration. In some embodiments, downlink signaling occurs first in the sTTI-containing special subframe followed by a guard period followed by uplink signaling in the sTTI-containing special subframe. In some embodiments, the special subframe has a duration of 14 symbols, no more than four of the 14 symbols being a duration of a guard period, GP, the GP following a downlink sTTI and preceding an uplink sTTI. In some embodiments, the processing circuitry (22) is further configured to form the special subframe having the at least one sTTI based on scheduling information received from the network node.

According to another aspect, a method for use in a wireless device in a wireless communication network for communicating with at least one network node is provided. The method includes obtaining information regarding inclusion of at least one of an uplink, UL, signal and a downlink, DL, signal to occur during at least one short transmission time interval, sTTI, in a special subframe of a radio frame to create an sTTI-containing special subframe. The method also includes communicating with the network node by one of sending the uplink signal and receiving the downlink signal during the at least one sTTI.

According to this aspect, in some embodiments, the at least one sTTI is of two symbols duration. In some embodiments, the at least one sTTI at least partly occupies at least one symbol of a guard period, GP, of the special subframe. In some embodiments, the GP of the sTTI-containing special subframe occupies fewer symbols than a GP of a special subframe not having any sTTIs. In some embodiments, the at least one sTTI occurs in one of: symbols covering both a downlink part, DwPTS, and a guard period, GP, of the special subframe; and symbols covering both the GP and an uplink part, UpPTS, of the special subframe. In some embodiments, at least one symbol of a downlink part, DwPTS, of the special subframe is used as a guard period, GP, for the sTTI-containing special subframe and at least one UL sTTI occupies at least one symbol of a GP of the special subframe. In some embodiments, a physical downlink control channel, PDCCH is configured to be of shorter duration than the duration of the DwPTS. In some embodiments, at least one symbol of the UpPTS in the special subframe is used as a guard period, GP, in the sTTI-containing subframe and at least one DL sTTI occupies at least one symbol of the GP of the special subframe. In some embodiments, no wireless device is granted transmission of sounding reference signals, SRS, and no physical random access channel, PRACH, is allocated in the special subframe. In some embodiments, multiple switches between UL and DL are supported for sTTIs in the sTTI-containing special subframe. In some embodiments, the special subframe has a downlink part, DwPTS, of at least three symbols duration, a guard period of at least nine symbols duration, and an uplink part, UpPTS, of at least one symbol duration. In some embodiments, the special subframe has a downlink part, DwPTS, of at least eight symbols duration, a guard period of at least three symbols duration, and an uplink part, UpPTS, of at least one symbol duration. In some embodiments, downlink signaling occurs first in the sTTI-containing special subframe followed by a guard period followed by uplink signaling in the sTTI-containing special subframe. In some embodiments, the special subframe has a duration of 14 symbols, no more than four of the 14 symbols being a duration of a guard period, GP, the GP following a downlink sTTI and preceding an uplink sTTI. In some embodiments, the method further includes forming the special subframe having the at least one sTTI based on scheduling information received from the network node.

According to yet another aspect, a wireless device configured to communicate with a network node in a wireless communication system is provided. The wireless device includes a special subframe module configured to obtain information regarding inclusion of at least one of forming an uplink, UL, signal and forming a downlink, DL, signal during at least one short transmission time interval, sTTI, in a special subframe of a radio frame to create an sTTI-containing special subframe. The wireless device also includes a transceiver module configured to communicate with the network node by one of sending the uplink signal and receiving the downlink signal during the at least one sTTI.

According to another aspect, a network node in a wireless communication network for communicating with at least one wireless device is provided. The network node includes processing circuitry configured to schedule at least one of uplink, UL, transmissions and downlink, DL, transmissions during at least one short transmission time interval, sTTI, in a special subframe of a radio frame to create an sTTI-containing special subframe. The network node also includes a transceiver configured to communicate with the at least one wireless device during the scheduled at least one sTTI.

According to this aspect, in some embodiments, the at least one sTTI is of two symbols duration. In some embodiments, the at least one sTTI at least partly occupies at least one symbol of a guard period, GP, of the special subframe. In some embodiments, the sTTI-containing special subframe includes a guard period, GP, and the GP of the sTTI-containing special subframe occupies fewer symbols than a GP of a special subframe not having any sTTIs. In some embodiments, the at least one sTTI is scheduled in one of: time symbols covering both a downlink part, DwPTS, and a guard period, GP, of the special subframe; and time symbols covering both a GP and an uplink part, UpPTS, of the special subframe. In some embodiments, at least one symbol of a DwPTS of the special subframe is used as a guard period, GP, for the sTTI-containing special subframe and at least one UL sTTI is scheduled in at least one symbol of a GP of the special subframe. In some embodiments, the physical downlink control channel, PDCCH is configured to be of shorter duration than the duration of the DwPTS. In some embodiments, at least one time symbol of the UpPTS in the special subframe is used as a guard period, GP, in the sTTI-containing subframe and at least one DL sTTI is scheduled in at least one symbol of the GP of the special subframe. In some embodiments, no wireless device is granted transmission of sounding reference signals, SRS, and no physical random access channel, PRACH, is allocated in the special subframe. In some embodiments, multiple switches between UL and DL are supported for sTTIs in the sTTI-containing special subframe. In some embodiments, the special subframe has a downlink part, DwPTS, of at least three symbols duration, a guard period of at least nine symbols duration, and an uplink part, UpPTS, of at least one symbol duration. In some embodiments, the special subframe has a downlink part, DwPTS, of at least eight symbols duration, a guard period of at least three symbols duration, and an uplink part, UpPTS, of at least one symbol duration. In some embodiments, downlink signaling occurs first in the sTTI-containing special subframe followed by a guard period followed by uplink signaling in the sTTI-containing special subframe. In some embodiments, the sTTI-containing special subframe is configured for scheduling communication with a first wireless device while a special subframe without sTTIs is configured for scheduling communication with a second wireless device. In some embodiments, the special subframe has a duration of 14 symbols, no more than four of the 14 symbols being a duration of a guard period, GP, the GP following a downlink sTTI and preceding an uplink sTTI.

According to another aspect, a method for use in a network node in a wireless communication network for communicating with at least one wireless device is provided. The method includes scheduling at least one of uplink, UL, transmissions and downlink, DL, transmissions during at least one short transmission time interval, sTTI, in a special subframe of a radio frame to create an sTTI-containing special subframe. The method also includes communicating with the at least one wireless device during the scheduled at least one sTTI.

According to this aspect, in some embodiments, the at least one sTTI is of two symbols duration. In some embodiments, the at least one sTTI at least partly occupies at least one symbol of a guard period, GP, of the special subframe. In some embodiments, the sTTI-containing special includes a guard period, GP, and the GP of the sTTI-containing special subframe occupies fewer symbols than a GP of a special subframe not having any sTTIs. In some embodiments, the at least one sTTI is scheduled in one of: time symbols covering both a downlink part, DwPTS, and a guard period, GP, of the special subframe; and time symbols covering both a GP and an uplink part, UpPTS, of the special subframe. In some embodiments, at least one symbol of a DwPTS of the special subframe is used as a guard period, GP, for the sTTI-containing special subframe and at least one UL sTTI is scheduled in at least one symbol of a GP of the special subframe. In some embodiments, a physical downlink control channel, PDCCH is configured to be of shorter duration than the duration of the DwPTS. In some embodiments, at least one symbol of the UpPTS in the special subframe is used as a guard period, GP, in the sTTI-containing subframe and at least one DL sTTI is scheduled in at least one symbol of the GP of the special subframe. In some embodiments, no wireless device is granted transmission of sounding reference signals, SRS, and no physical random access channel, PRACH, is allocated in the special subframe. In some embodiments, multiple switches between UL and DL are supported for sTTIs in the sTTI-containing special subframe. In some embodiments, the special subframe has a downlink part, DwPTS, of at least three symbols duration, a guard period of at least nine symbols duration, and an uplink part, UpPTS, of at least one symbol duration. In some embodiments, the special subframe has a downlink part, DwPTS, of at least eight symbols duration, a guard period of at least three symbols duration, and an uplink part, UpPTS, of at least one symbol duration. In some embodiments, downlink signaling occurs first in the sTTI-containing special subframe followed by a guard period followed by uplink signaling in the sTTI-containing special subframe. In some embodiments, the sTTI-containing special subframe is configured for scheduling communication with a first wireless device while a special subframe without sTTIs is configured for scheduling communication with a second wireless device. In some embodiments, the special subframe has a duration of 14 symbols, no more than four of the 14 symbols being a duration of a guard period, GP, the GP following a downlink sTTI and preceding an uplink sTTI.

According to another aspect, a network node in a wireless communication network for communicating with at least one wireless device is provided. The network node includes a special subframe scheduling module configured to schedule at least one of uplink, UL, transmissions and downlink, DL, transmissions during at least one short transmission time interval, sTTI, in a special subframe of a radio frame to create an sTTI-containing special subframe. The network node also includes a transceiver module configured to communicate with the at least one wireless device during the scheduled at least one sTTI.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 16 illustrates an example of inserting 6 DL short TTIs on a special SF with configuration 1 or 6;

FIG. 17 illustrates an example of inserting 4 DL short TTIs and 2 UL short TTIs on a special SF with configuration 1 or 6;

DETAILED DESCRIPTION

Figure 1:
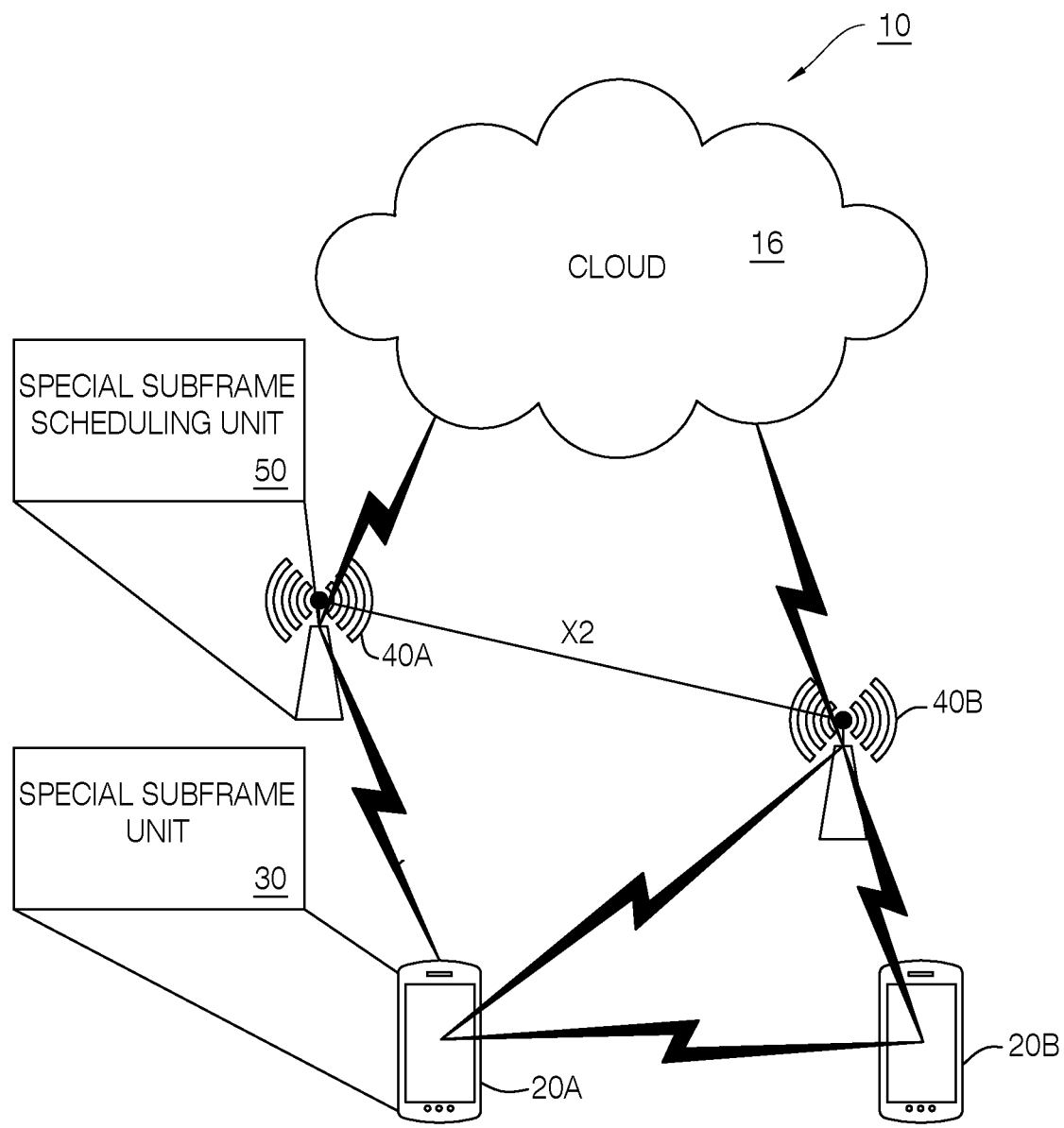
FIG. 1 is a block diagram of a wireless communication network constructed according to principles set forth herein.

Before describing in detail exemplary embodiments, it is noted that the embodiments reside primarily in combinations of apparatus components and processing steps related to introducing short transmission time intervals in time division duplex special subframes. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments introduce short TTIs on TDD special SFs, where the switch from DL to UL occurs for legacy wireless devices. In particular, the GP of a special SF can be used for UL or/and DL short TTI (sTTI) transmissions, without effecting legacy TDD wireless devices. As used herein, a legacy wireless device is a wireless device not configured to transmit and receive sTTI-containing special subframes as described below. Also, as used herein, short TTIs have a duration less than a duration of a special subframe. In LTE, embodiments of a special subframe have a duration of 14 symbols and a sTTI is of 13 symbols duration or shorter. In particular, in LTE, for example, an sTTI may have a duration less than 7 symbols, such as 2 symbols. The symbols referred to herein are time symbols with a certain time duration, such as for example OFDM symbols.

The proposed solution allows short TTI transmissions in special SFs, which provides latency reduction in frame alignment and HARQ RTT for TDD, without affecting legacy TDD and LAA operation. As used herein, a special subframe or legacy special subframe is a subframe that is configured according to previously existing standards and consequently, does not have sTTIs. In LTE, for example, special subframes are shown in FIGS. 8, 9, and 14 and 15, discussed below in detail. In contrast to special subframes, a sTTI-containing special subframe is a special subframe that includes sTTIs, such as the configurations of FIGS. 10-13 and 16-18, also discussed below in detail. Similarly, a guard period of a special subframe is a guard period of a special subframe that does not include a sTTI (also referred to as a legacy guard period), and is located as shown in FIGS. 8, 9, and 14 and 15 for example. A sTTI typically occupies at least one time symbol where the guard period is present in the special subframe (the same symbol number), hence the guard period of the sTTI containing special subframe typically has a duration which is less than the guard period of the special subframe not containing any sTTI (also referred to as a "legacy" special subframe).

Moreover, by introducing multiple short TTIs in a special SF, the guard period for a short TTI wireless device close to the network node can be reduced by scheduling the wireless device a short time interval after the downlink is received. The term "short", as used herein, means that the short TTIs are less than 1 millisecond in LTE, or less than the duration of a special subframe in other radio access technologies (RATs). Therefore, the guard period (GP) for short TTI (sTTI) transmissions is no longer limited by the cell size and thus can be further reduced. This can reduce the GP overhead and improve resource utilization in TDD. A GP in an sTTI-containing special subframe is a period that follows a downlink sTTI and precedes an uplink sTTI. A downlink sTTI is an sTTI used to transmit from a network node or receive by a wireless device on the downlink. An uplink sTTI is an sTTI used to receive by a network node or transmit from a wireless device on the uplink.

A general concept of the present invention thus to introduce one or more short TTIs in a special subframe (i.e. legacy special subframe not previously containing any sTTIs), wherein the sTTI(s) typically occupies one or more symbols where a guard period is present in the (legacy) special subframe. These sTTIs may be used for UL and/or DL transmissions of information such as data and control information. Some embodiments introduce short TTIs on TDD special SFs for different DwPTS/GP/UpPTS configurations to create sTTI-containing special subframes. Some embodiments operate under the assumption that there are two-antenna ports for DL transmission, and a fixed short TTI (sTTI) length of 2 symbols for both DL and UL. The same methodology can be used for introducing different short TTI lengths, such as 3, 4, 5, 6, 7, 8, 9, 10, 11, 12 or 13 symbols, and different antenna port settings. In some embodiments, a sTTI is of duration less than seven symbols, such as two symbols. Note that the configurations mentioned in this section refer to the special SF configurations as shown in Table 2, not the DL/UL configurations. The same solution of using the GP for sTTI transmissions can be used for any of the SF configurations as long as either part of the DwPTS, part of the UpPTS, or the original GP can be used as a guard period by the network node, e.g., base station or eNB (i.e., there are no legacy wireless devices scheduled there, and there are no Cell specific Reference Signals (CRSs) transmitted in DwPTS, or UpPTS is not used for channel sounding or random access). A symbol is a duration of time in a special subframe and in an sTTI-containing special subframe for transmitting or receiving a symbol, such as, for example, an OFDM symbol. In LTE, there are 14 successive symbols in a single special subframe. The symbols could also be time symbols used in the radio access technology named New Radio (NR).

In some embodiments of the invention, uplink (UL) or downlink (DL) transmission is scheduled in at least one sTTI, which sTTI is scheduled in time symbols covering either both a (legacy) downlink part (DwPTS) (at least one time symbol used in a special subframe for DwPTS) and in time symbols of a GP-part (at least one time symbol used as GP in a special subframe), or both an uplink part (UpPTS) and a GP part (at least one symbol of each) of the (legacy) special subframe. In other embodiments, at least one time symbol of the DwPTS in a special subframe is used as a GP in the sTTI containing special subframe, and at least one UL sTTI is scheduled in one or more symbols of the GP of the special subframe. In other embodiments one or more time symbols used for UpPTS in the special subframe is used as GP in the sTTI containing special subframe, and at least one DL sTTI is scheduled in one or more time symbols used as GP in the special subframe. In some of the embodiments, multiple switches between UL and DL is supported for the sTTIs scheduled in the special subframes.

Referring now to the drawing figures in which like reference designators refer to like elements, FIG. 1 is a block diagram of a wireless communication network 10 constructed according to principles set forth herein. The wireless communication network 10 includes a cloud 16 which may include the Internet and/or the public switched telephone network (PSTN). Cloud 16 may also serve as a backhaul network of the wireless communication network 10. The wireless communication network 10 includes wireless devices 20A and 20B, referred to collectively herein as wireless devices 20. The wireless devices 20 are served by one or more network nodes 40A and 40B, referred to collectively as network nodes 40. Note that although only two wireless devices 20 and two network nodes 40 are shown for convenience, the wireless communication network 10 may typically include many more WDs 20 and network nodes 40.

A WD 20 may include processing circuitry to implement a special subframe unit 30. The special subframe unit 30 is configured to form at least one of an uplink, UL, signal and a downlink, DL, signal during at least one sTTI in a special subframe of a radio frame to create an sTTI-containing special subframe. Similarly, a network node 40 may include processing circuitry to implement a special subframe scheduling unit 50. The special subframe scheduling unit 50 is configured to schedule at least one of uplink, UL, transmissions and downlink, DL, transmissions during at least one short transmission time interval, sTTI, in a special subframe of a radio frame to create an sTTI-containing special subframe.

The term wireless device or mobile terminal used herein may refer to any type of wireless device communicating with a network node 40 and/or with another wireless device 20 in a cellular or mobile communication system 10. Examples of a wireless device 20 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term "network node" used herein may refer to any kind of network node in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

Although embodiments are described herein with reference to certain functions being performed by network nodes 40, which may be base stations, it is understood that the functions can be performed in other network nodes and elements. It is also understood that the functions of the network nodes 40 can be distributed across network cloud 16 so that other nodes can perform one or more functions or even parts of functions described herein.

Figure 2:
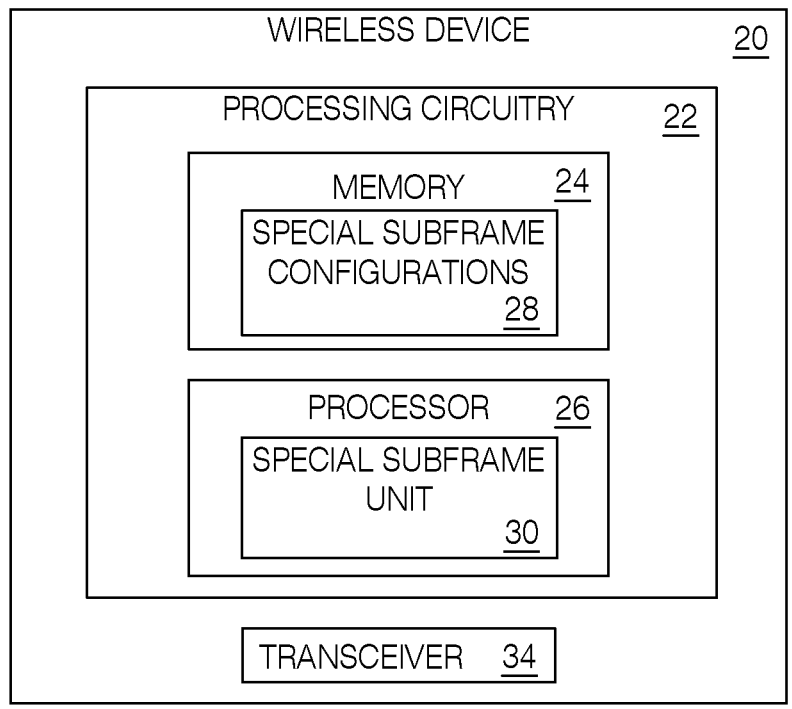
FIG. 2 is a block diagram of a wireless device (WD) constructed in accordance with principles set forth herein.

FIG. 2 is a block diagram of a WD 20 constructed in accordance with principles set forth herein. The WD 20 includes processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may include a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store special subframe configurations 28 that are generated by a special subframe unit 30, as implemented by the processing circuitry 26. The special subframe unit 30 is configured to form at least one of an uplink, UL, signal and a downlink, DL, signal to occur during at least one sTTI in a special subframe of a radio frame to create an sTTI-containing special subframe. A transceiver 34 is configured to communicate with a network node 40 by one of sending the uplink signal and receiving the downlink signal during the at least one sTTI. In some embodiments, the special subframe unit 30 is configured to form a special subframe having at least one sTTI based on scheduling information received from the network node 40.

Figure 3:
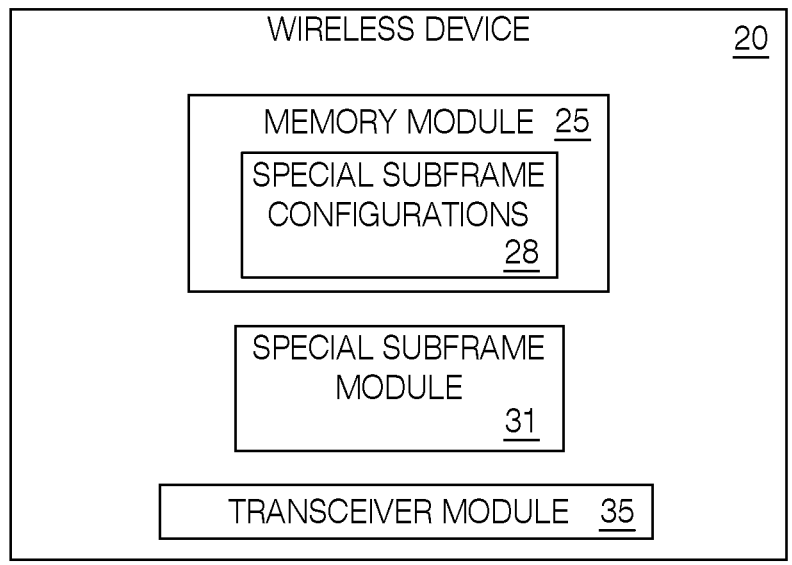
FIG. 3 is a block diagram of an alternative embodiment of WD that has modules that may be implemented at least in part in software.

FIG. 3 is a block diagram of an alternative embodiment of WD 20 that has modules that may be implemented at least in part in software. A memory module 25 is configured to store special subframe configurations 28 generated by a special subframe module 31. The special subframe module 31 is implemented in software that when executed by a processor causes the processor to form at least one of an uplink, UL, signal and a downlink, DL, signal to occur during at least one sTTI in a special subframe of a radio frame to create an sTTI-containing special subframe. The transceiver 25, which may be implemented in part in software, is configured to communicate with a network node 40 by one of sending the uplink signal and receiving the downlink signal during the at least one sTTI.

Figure 4:
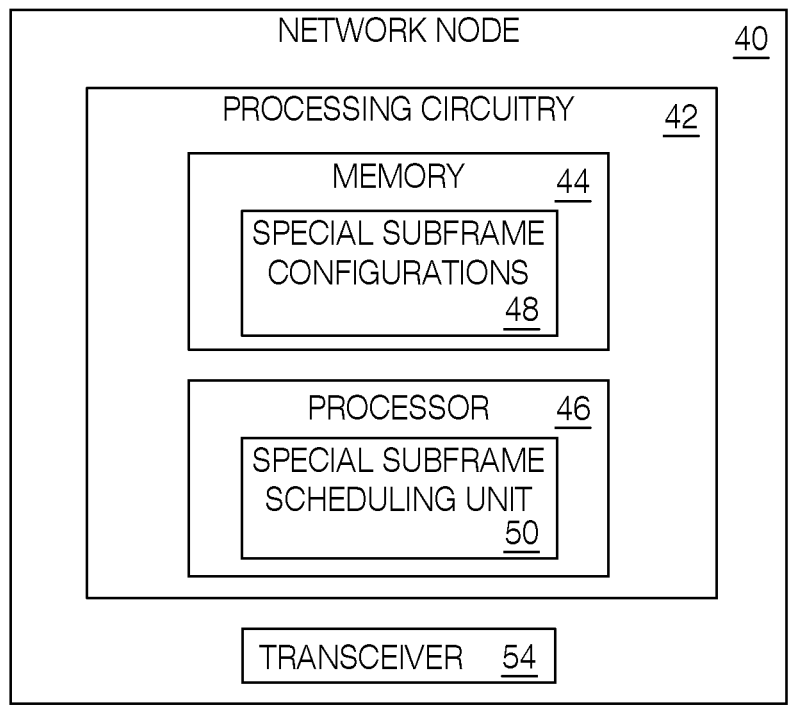
FIG. 4 is a block diagram of a network node constructed in accordance with principles set forth herein.

FIG. 4 is a block diagram of a network node 40 constructed in accordance with principles set forth herein. Network node 40 includes processing circuitry 42. In some embodiments, the processing circuitry may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store special subframe configurations 48 generated by special subframe scheduling unit 50 implemented by the processor 46. The special subframe scheduling unit 50 is configured to schedule at least one of uplink, UL, transmissions and downlink, DL, transmissions during at least one sTTI in a special subframe of a radio frame to create an sTTI-containing special subframe. In some embodiments, the at least one sTTI is of two symbols duration and occupies at least one symbol of a guard period of the special subframe. In some embodiments, the guard period of the sTTI-containing special subframes occupies fewer symbols than a guard period of a special subframe not having any sTTIs. A transceiver 54 is configured to communicate with at least one wireless device 20 during the scheduled at least one sTTI.

Figure 5:
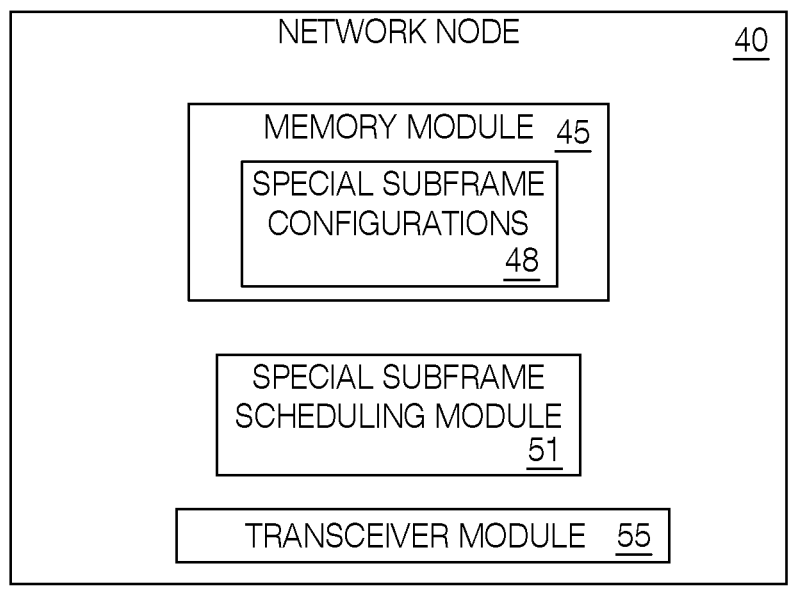
FIG. 5 is a block diagram of an alternative embodiment of the network node that has modules that may be implemented at least in part in software.

FIG. 5 is a block diagram of an alternative embodiment of the network node 40 that has modules that may be implemented at least in part in software. A memory module 45 is configured to store the special subframe configurations 48 generated by the special subframe scheduling module 51. The special subframe scheduling module 51 may be implemented as software that when executed by a processor causes the processor to schedule at least one of uplink, UL, transmissions and downlink, DL, transmissions during at least one sTTI in a special subframe of a radio frame to create an sTTI-containing special subframe. The transceiver 55 is configured to communicate with the at least one wireless device 20 during the scheduled at least one sTTI.

Figure 6:
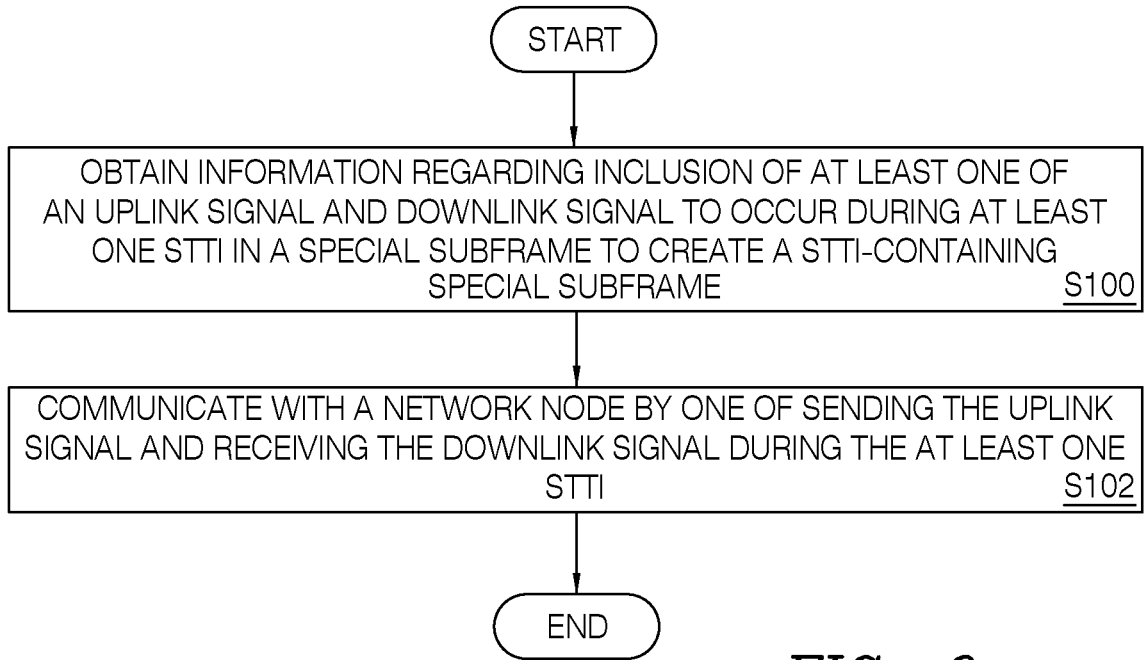
FIG. 6 is a flowchart of an exemplary process in a wireless device for communicating with a network node.

FIG. 6 is a flowchart of an exemplary process in a wireless device 20 for communicating with a network node 40. The process includes forming, via the special subframe unit 30, at least one of an uplink, UL, signal and a downlink, DL, signal to occur during at least one sTTI in a special subframe of a radio frame to create an sTTI-containing special subframe (block S100). The process also includes communicating with the network node 40 by one of sending the uplink signal and receiving the downlink signal during the at least one sTTI via the transceiver 34 (block S102).

Figure 7:
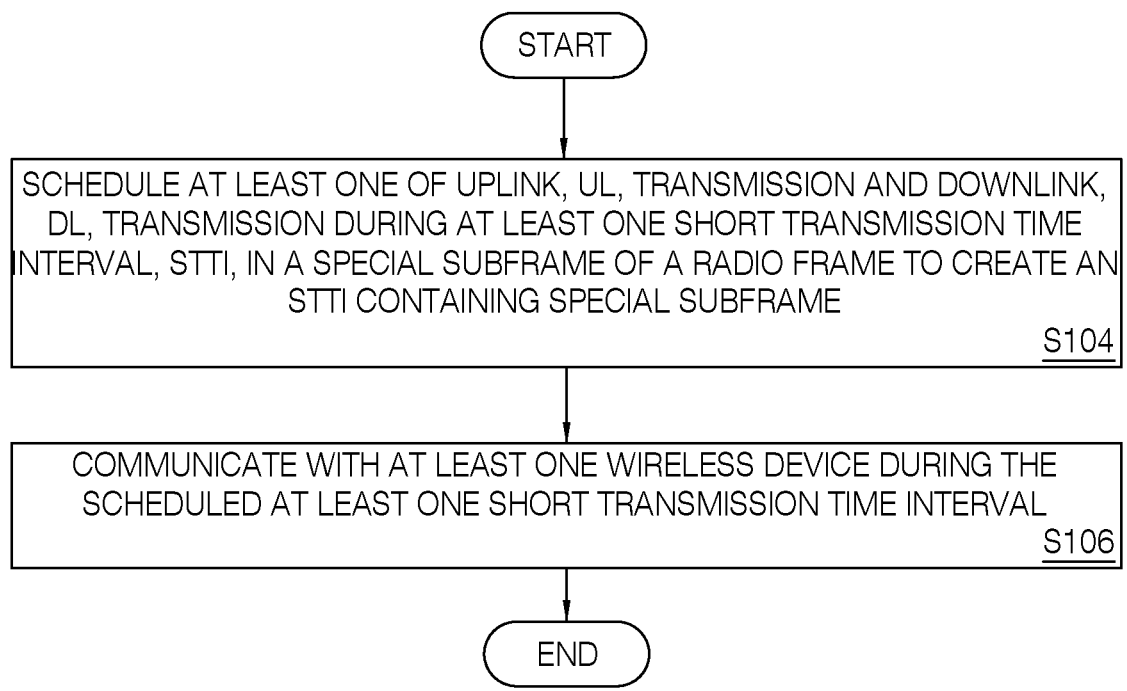
FIG. 7 is a flowchart of an exemplary process in a network node for communicating with a wireless device.

FIG. 7 is a flowchart of an exemplary process in a network node 40 for communicating with a wireless device 20. The process includes scheduling, via special subframe scheduling unit 50, at least one of uplink, UL, transmissions and downlink, DL, transmissions during at least one sTTI in a special subframe of a radio frame to create an sTTI-containing special subframe (block S104). The process also includes communicating with the at least one wireless device during the scheduled at least one sTTI via the transceiver 54 (block S106)

Figure 8:
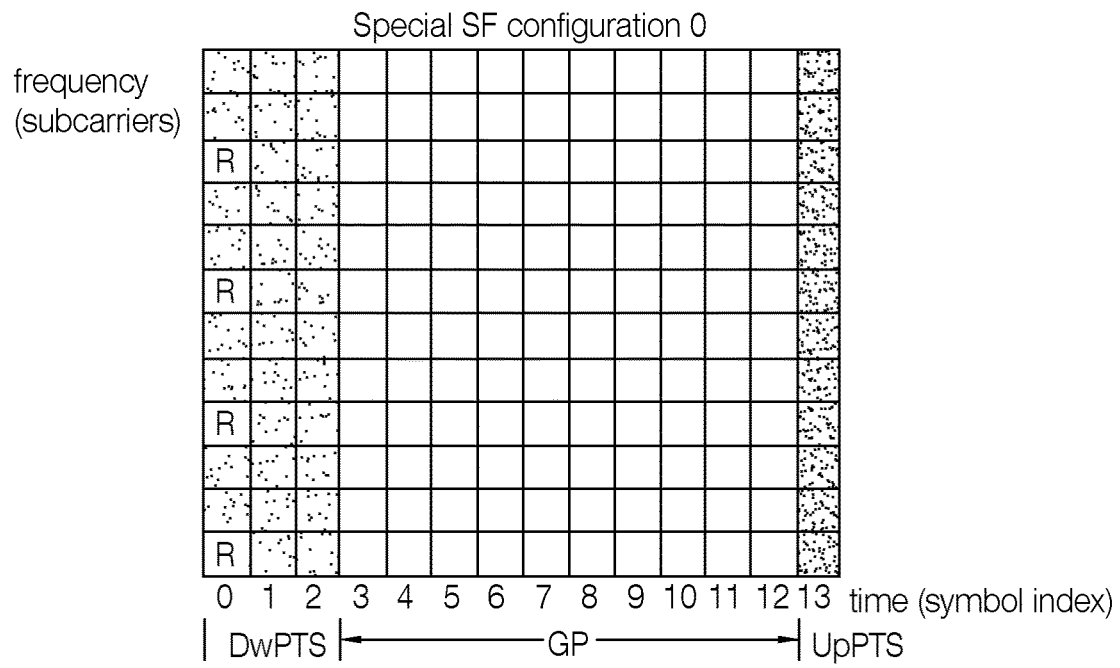
FIG. 8 illustrates configuration 0 for special SF in legacy FS2.
Figure 9:
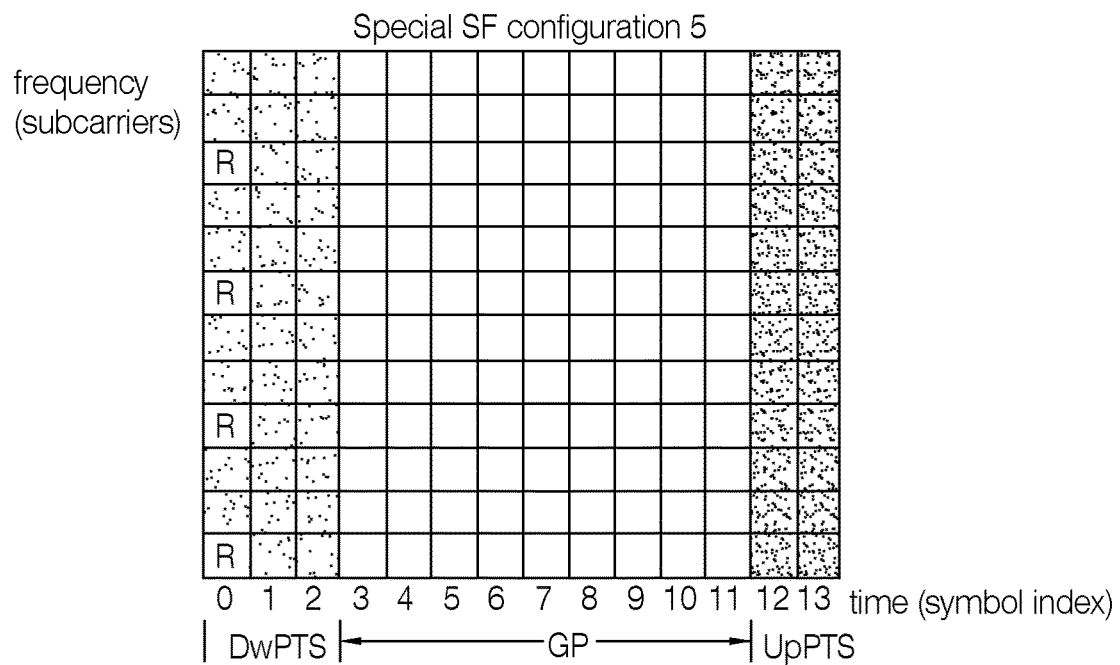
FIG. 9 illustrates and configuration 5 for special SF in legacy FS2.

FIG. 8 illustrates configuration 0 and FIG. 9 illustrates configuration 5 for a special SF in a legacy, e.g., known LTE, FS2 with normal CP for both UL and DL in one resource block. In FIGS. 8 and 9, the lightly shaded regions denote the location of the DwPTS and the darkly shaded regions denote the location of the UpPTS. The boxes with "R" are resource elements reserved for CRS (Cell specific Reference Signals). For both configurations, the first three symbols of this SF are allocated for DwPTS. The number of symbols allocated for UpPTS are 1 and 2 for configuration 0 and configuration 5, respectively. As shown in FIGS. 8 and 9, the GP duration for configurations 0 and 5 are 10 and 9 symbols, respectively. The large GP duration provides flexibility for introducing UL short TTIs, since legacy wireless devices expect to neither transmit nor receive any signals during this time period. An important consequence is that the legacy wireless devices do not expect any CRS during this GP.

Figure 10:
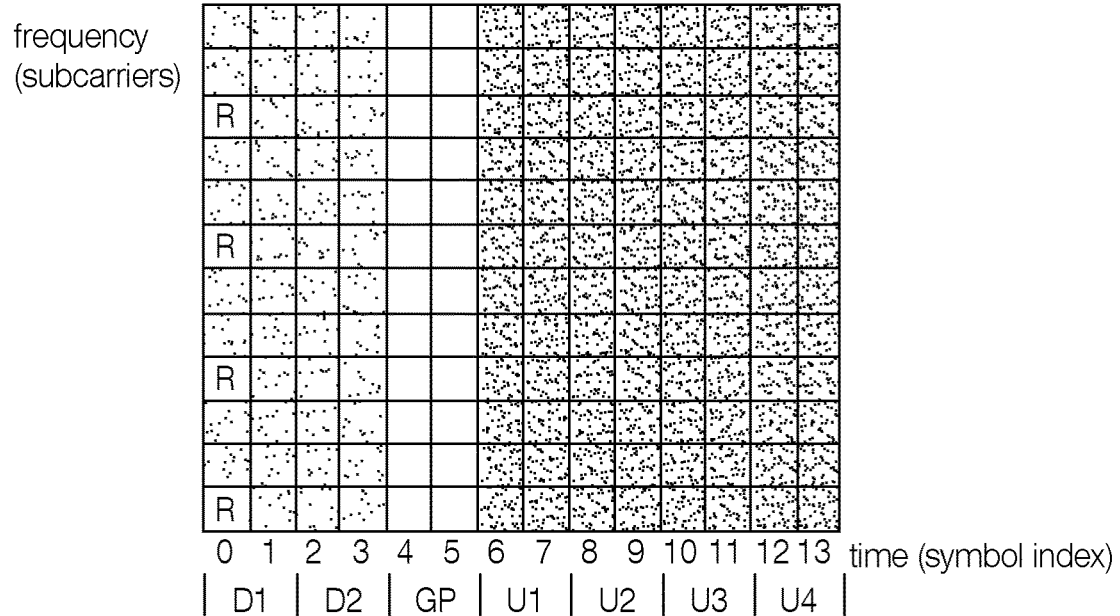
FIG. 10 illustrates an example of inserting 2 DL short TTIs and 4 UL short TTIs on a special SF with configuration 0 or 5.

FIG. 10 illustrates an example of inserting 2 DL short TTIs and 4 UL short TTIs on a special SF with configuration 0 or 5 to form an sTTI-containing special subframe. In FIGS. 10-19, the lightly shaded regions denote the downlink sTTIs and the darkly shaded regions denote the uplink sTTIs, In the following, "Di" and "Ui" denote the i-th short TTI in DL and UL, respectively. However, in most cases, the first 2 or 3 symbols of the sub-frame may be allocated to a Physical Downlink Control Channel (PDCCH) such that the first short TTI, D1, is not used for data transmission.

Several non-limiting embodiments are shown in the drawing figures.

Embodiment 1 (FIG. 10)

A DL short TTI can cross the border between DwPTS and GP of a legacy special SF, e.g., D2 consists of the last symbol of DwPTS and the first symbol of GP, for both configurations 0 and 5. A legacy special subframe as used herein is a special subframe that does not contain sTTIs. Also, as noted above, an sTTI is a TTI having a duration less than the duration of the special subframe. Also, a DL sTTI is an sTTI used to transmit or receive on the downlink, and an UL sTTI is an sTTI used to transmit or receive on the uplink.

Embodiment 1 has the following characteristics.

In the sTTI-containing special subframe, a UL short TTI can cross the border between GP and UpPTS of a legacy special SF, e.g., U4 consists of the last symbol of GP and the first symbol of UpPTS for configuration 0.

Both UL and DL short TTIs can be introduced in GP of a legacy special SF, e.g., U1-U4 for configuration 0.

In other words, in this embodiment, at least one sTTI is caused to occur in one of symbols covering both a downlink part, DwPTS, and a guard period, GP, of the special subframe and symbols covering both a GP and an uplink part, UpPTS, of the special subframe. The sTTI-containing special subframe according to this embodiment may be created by the special subframe unit 30 of the WD 20 and the special subframe scheduling unit 50 of the network node 40.

Figure 11:
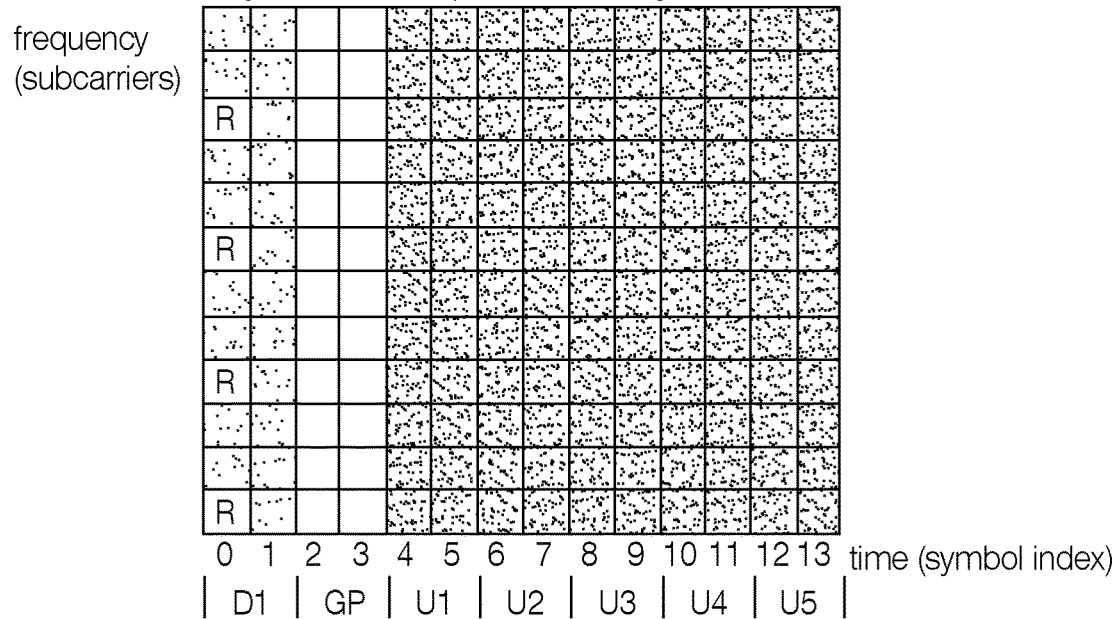
FIG. 11 illustrates an example of inserting 1 DL short TTIs and 5 UL short TTIs on a special SF with configuration 0 or 5.

FIG. 11 illustrates an example of inserting 1 DL short TTI and 5 UL short TTIs on a special SF with configuration 0 or 5, thereby creating an sTTI-containing special subframe. If the first two or three symbols are allocated to PDCCH and Physical Hybrid-ARQ Indicator Channel (PHICH), then D1 may not be used for data transmission. Thus, a second embodiment may be constructed as follows:

Embodiment 2 (FIG. 11)

Part of the DwPTS in time domain can be used as part of GP for short TTI transmissions, with PDCCH configured to be shorter than the DwPTS.

Uplink short TTIs are introduced in GP of a legacy special SF, e.g., U1-U5 for configuration 0, and U1-U4 for configuration 5.

Thus, in this embodiment, at least one symbol of a downlink part, DwPTS, of the special subframe is used as a guard period, GP, for the sTTI-containing special subframe and at least one UL sTTI occupies at least one symbol of a GP of the special subframe. In this embodiment, a physical downlink control channel, PDCCH may be configured to be of shorter duration than the duration of the DwPTS. The sTTI-containing special subframe according to this embodiment may be created by the special subframe unit 30 of the WD 20 and the special subframe scheduling unit 50 of the network node 40.

Figure 12:
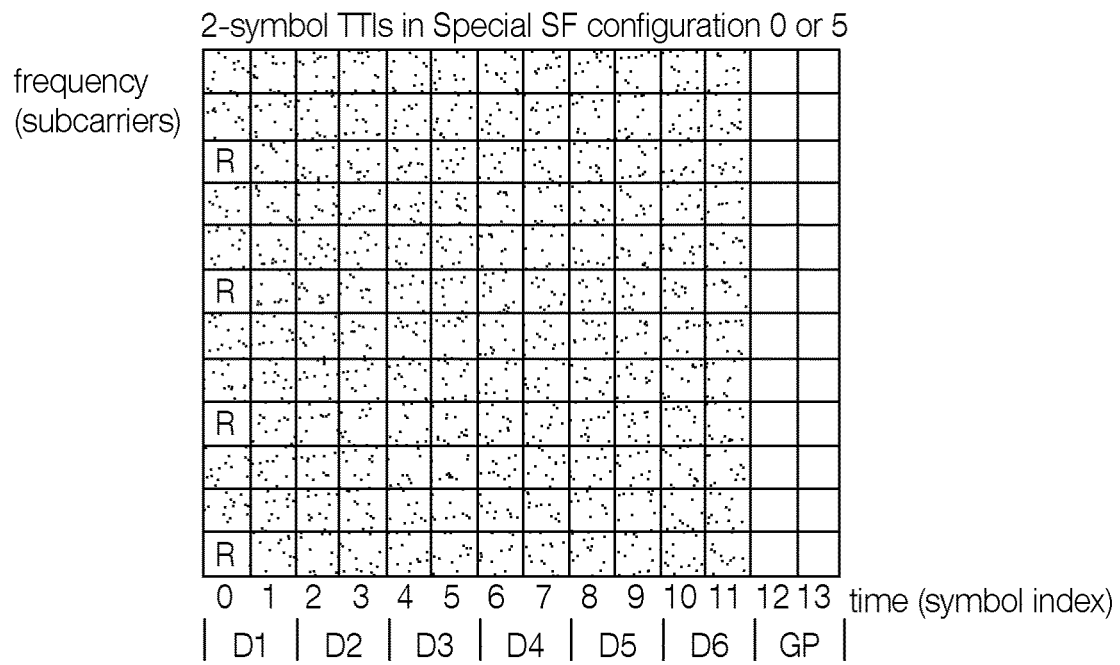
FIG. 12 illustrates an example of inserting 6 DL short TTIs on a special SF with configuration 0 or 5.

FIG. 12 illustrates an example of inserting 6 DL short TTIs on a special SF with configuration 0 or 5, thereby creating a sTTI-containing special subframe, which can be summarized as follows:

Embodiment 3

Part of UpPTS in time domain can be used as GP for short TTI transmissions, when no wireless device is granted transmissions of SRS here, or this part is not allocated to physical random access channel (PRACH).

Downlink short TTIs are introduced in GP of a legacy special SF, e.g., D2-D6 for configuration 0 and configuration 5.

Thus, in this embodiment, at least one symbol of an uplink part, UpPTS, in the special subframe is used as a guard period, GP, in the sTTI-containing subframe and at least one DL sTTI occupies at least one symbol of the GP of the special subframe. The sTTI-containing special subframe according to this embodiment may be created by the special subframe unit 30 of the WD 20 and the special subframe scheduling unit 50 of the network node 40.

Figure 13:
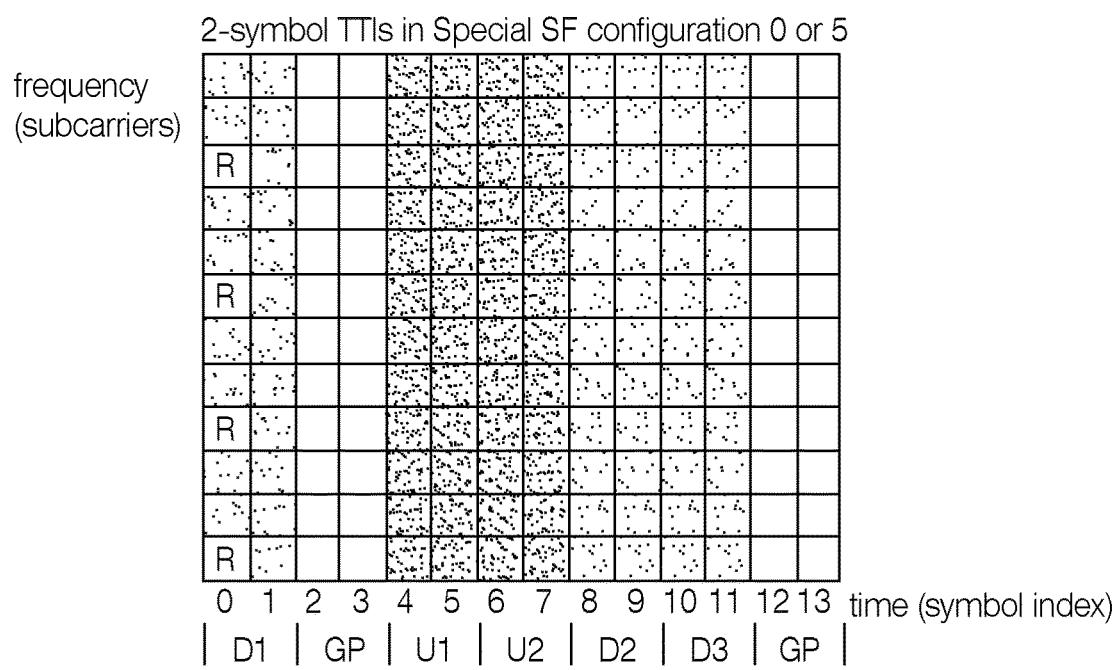
FIG. 13 illustrates an example of inserting 3 DL short TTIs and 2 UL short TTIs on a special SF with configuration 0 or 5.

FIG. 13 illustrates an example of inserting 3 DL short TTIs and 2 UL short TTIs on a special SF with configuration 0 or 5, thereby creating an sTTI-containing special subframe. Thus, a fourth embodiment may be summarized as:

Embodiment 4

Multiple switches between DL and UL can be supported for short TTI on a special SF. The sTTI-containing special subframe according to this embodiment may be created by the special subframe unit 30 of the WD 20 and the special subframe scheduling unit 50 of the network node 40.

Figure 14:
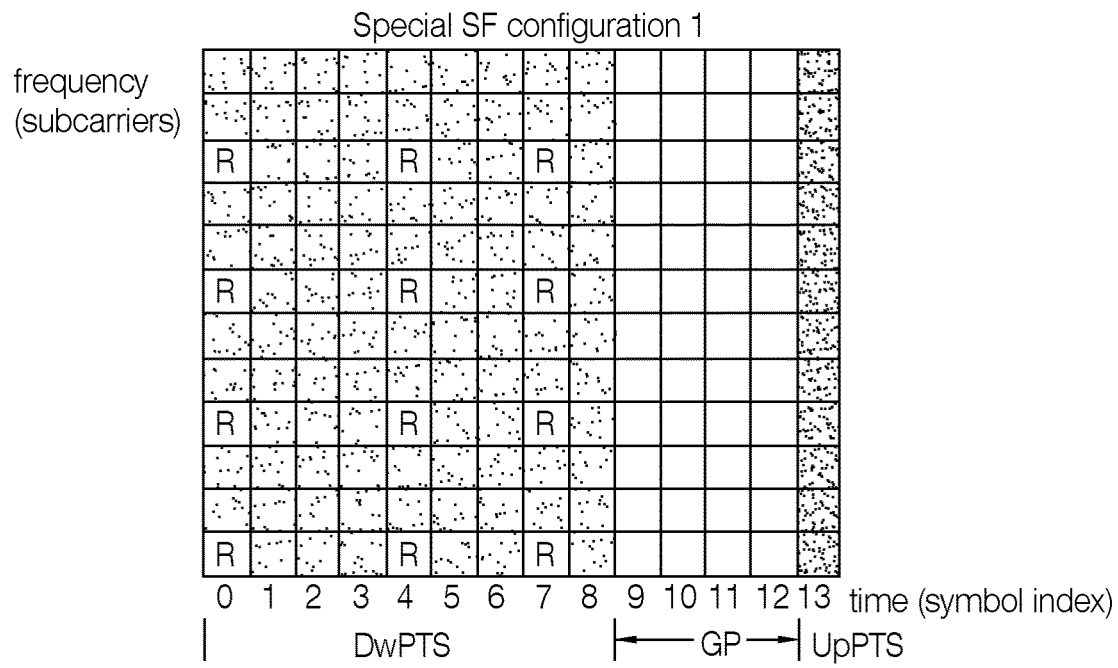
FIG. 14 illustrates configuration 1 for special SF in legacy FS2 with normal CP for both UL and DL in a resource block.
Figure 15:
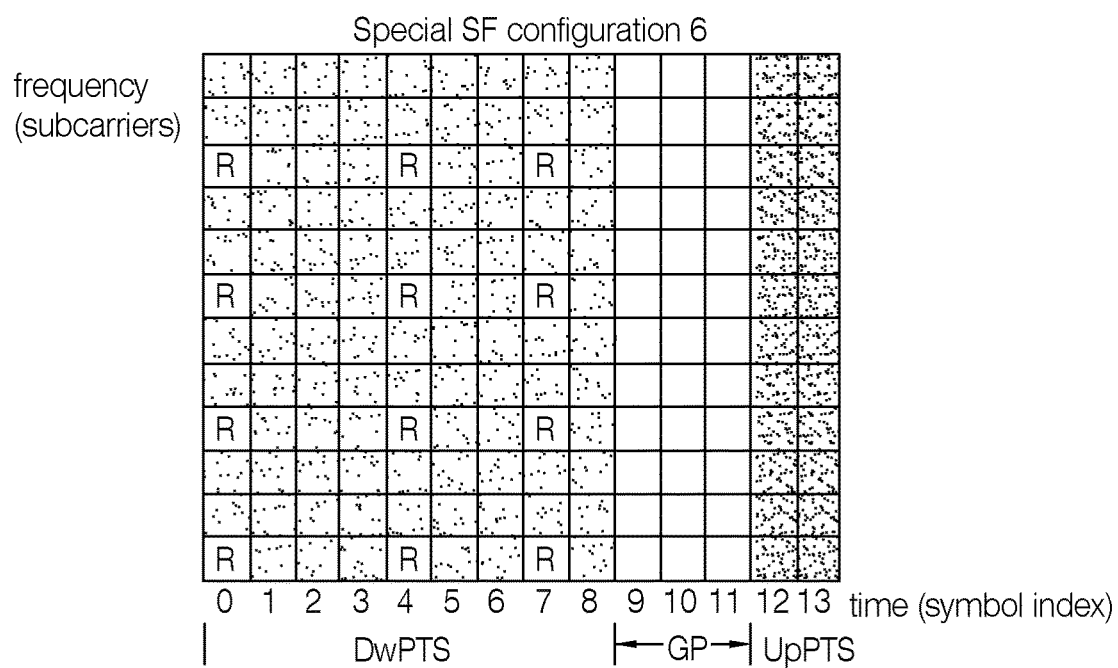
FIG. 15 illustrates configuration 6 for special SF in legacy FS2 with normal CP for both UL and DL in a resource block.

FIGS. 14 and 15 illustrate configurations 1 and 6 for a special SF in legacy FS2 with normal CP for both UL and DL in a resource block. For both configurations, the first nine symbols of this SF are allocated for DwPTS. The number of symbols allocated for UpPTS are 1 and 2 for configuration 1 and configuration 6, respectively. As shown in FIGS. 14 and 15, the GP duration for configurations 1 and 6 are 4 and 3 symbols, respectively. The small GP duration makes the introduction of UL short TTIs not as flexible as for the configurations 0 and 5. The sTTI-containing special subframe according to this embodiment may be created by the special subframe unit 30 of the WD 20 and the special subframe scheduling unit 50 of the network node 40.

Figures 16, 17:
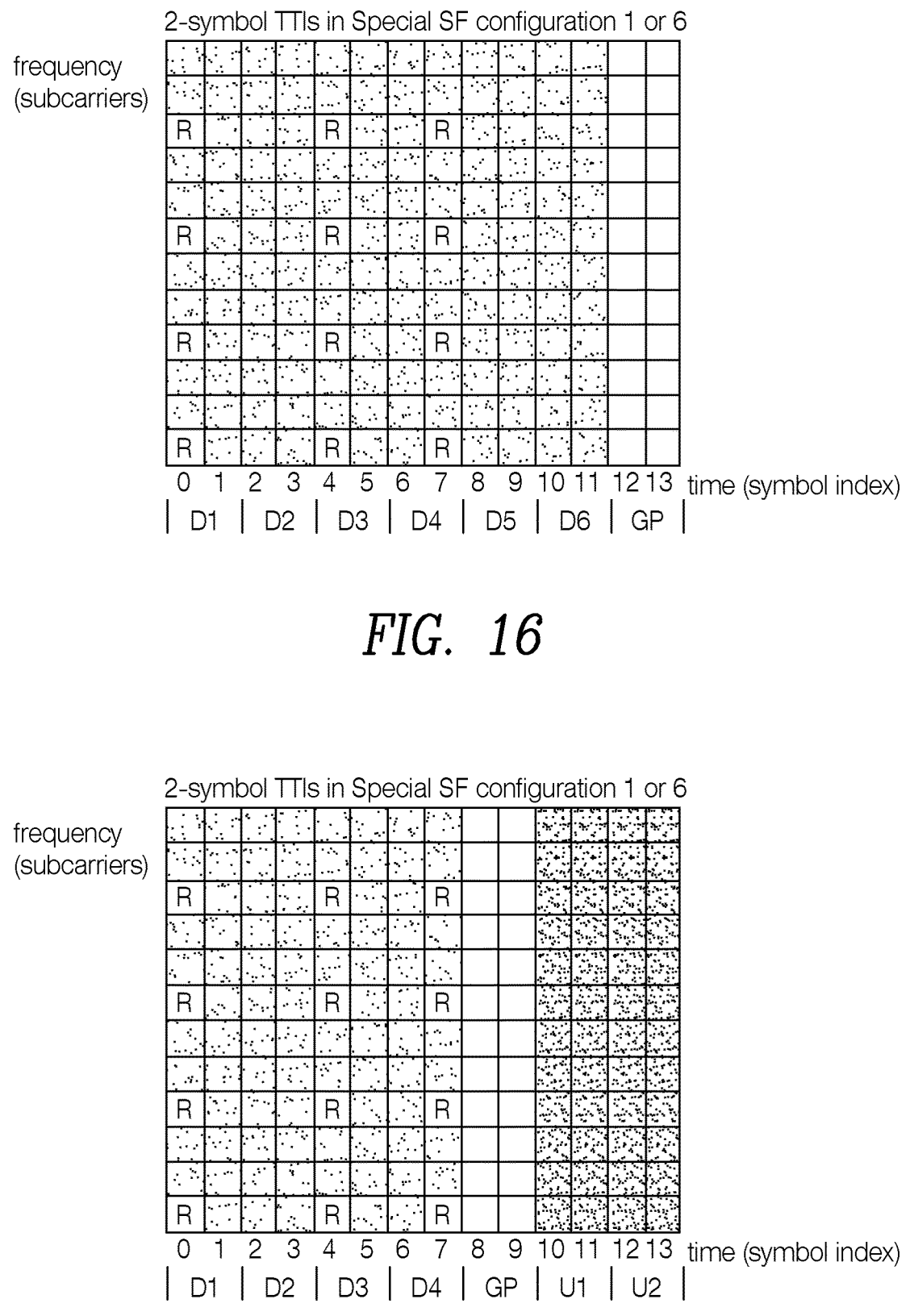

FIG. 16 illustrates an example of inserting 6 DL short TTIs on a special SF with configuration 1 or 6, thereby creating an sTTI-containing special subframe. In this example, only DL short TTIs are introduced on the special SF. However, at least the first short TTI, D1, is allocated to PDCCH and PHICH. The UpPTS can be used as GP for short TTI transmissions when no wireless device is granted transmissions of SRS here, or this part is not allocated to PRACH. Thus, in this embodiment, no wireless device is granted transmission of sounding reference signals (SRS) and no physical random access channel (PRACH) is allocated in the special subframe. The sTTI-containing special subframe according to this embodiment may be created by the special subframe unit 30 of the WD 20 and the special subframe scheduling unit 50 of the network node 40.

FIG. 17 illustrates an example of inserting 4 DL short TTIs and 2 UL short TTIs on a special SF with configuration 1 or 6, thereby creating an sTTI-containing special subframe. However, at least the first short TTI, D1, is allocated to a PDCCH and a PHICH. In this case, only UL short TTIs are introduced in GP of a legacy special SF, i.e., U1 and U2 for configuration 1, and U1 for configuration 6. Part of the DwPTS in the time domain (symbol 8) together with symbol 9 is used as GP for short TTI transmissions. The use of DwPTS as a guard period is possible also when legacy wireless devices are transmitting in other RBs during the DwPTS. However, a short guard is needed before the first UL transmission is received in the network node 40, e.g., base station/eNodeB such that the network node 40 can switch between transmitting and receiving. The sTTI-containing special subframe according to this embodiment may be created by the special subframe unit 30 of the WD 20 and the special subframe scheduling unit 50 of the network node 40.

Figure 18:
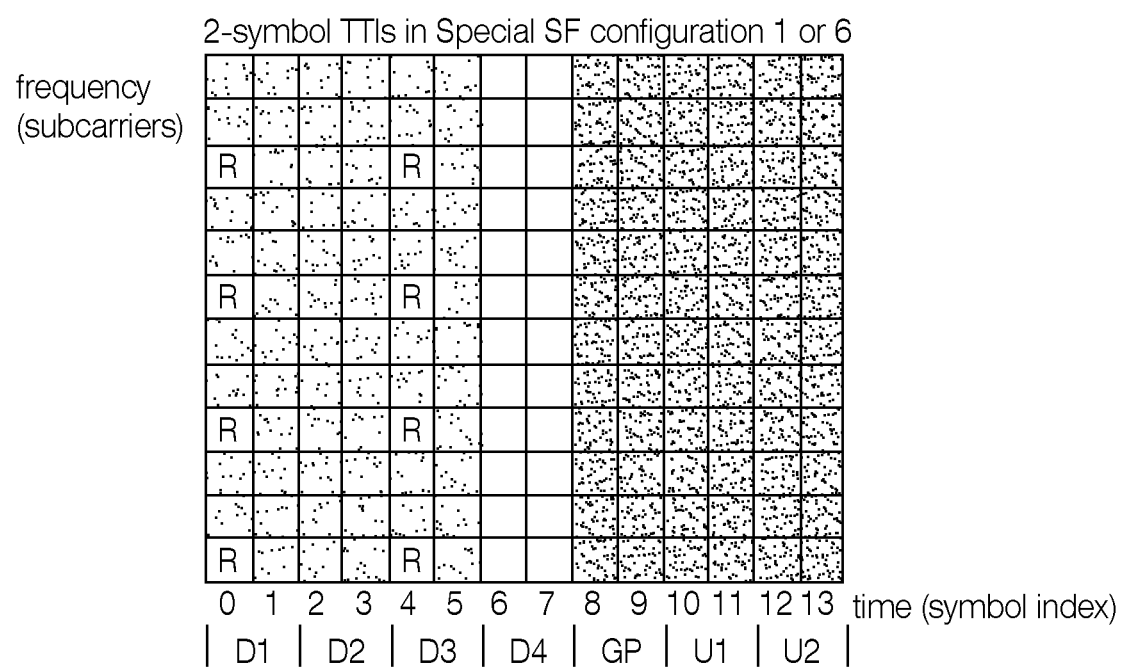
FIG. 18 illustrates an example of inserting 3 DL short TTIs and 3 UL short TTIs on a special SF with configuration 1 or 6.

FIG. 18 illustrates an example of inserting 3 DL short TTIs and 3 UL short TTIs on a special SF with configuration 1 or 6, thereby creating an sTTI-containing special subframe. However, at least the first short TTI, D1, is allocated to PDCCH and PHICH. In this example, part of DwPTS, i.e., symbol 6 and symbol 7 are used as a GP for short TTI transmissions. Symbol 8 in DwPTS is used for UL short TTI transmissions by not scheduling legacy wireless devices on DwPTS for DL transmissions. The sTTI-containing special subframe according to this embodiment may be created by the special subframe unit 30 of the WD 20 and the special subframe scheduling unit 50 of the network node 40.

Note that embodiments are not limited to the above-specified combinations of uplink and downlink short TTIs. Any other combination of uplink and/or downlink short TTIs may be employed in some embodiments, as long as the combination fits the special subframe. For example, the following combinations of downlink and uplink sTTIs may be implemented in some embodiments: (4 DL, 2 UL), (5 DL, 1 UL), (3 DL, 4UL), etc.

Figure 19:
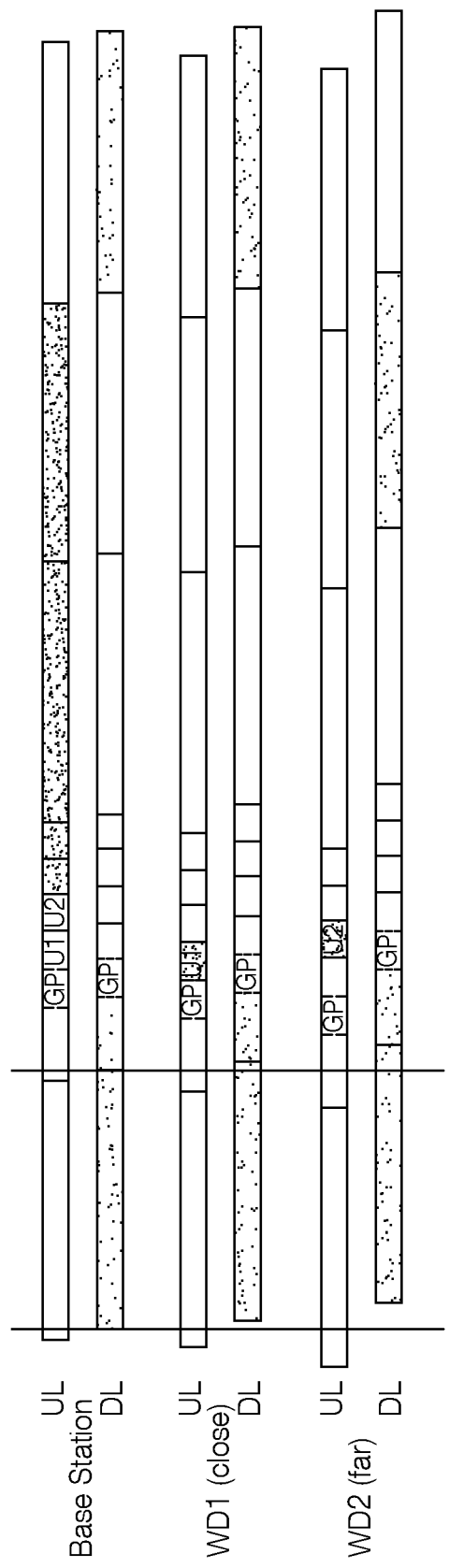
FIG. 19 illustrates the timing relations for short TTI WD1 close to the network node and short TTI WD2 far from the network node, considering a special SF with short TTIs inserted based on FIG. 10

FIG. 19 illustrates the timing relations for short TTI in a first WD,WD1 (close to the network node 40, e.g., base station) and short TTI in a second WD, WD2 (far from the network node 40), considering a special SF with short TTIs inserted based on FIG. 3. In legacy TDD, the guard period must be large enough to allow the legacy wireless device to receive the DL transmission and switch from DL to UL before it starts the timing advanced uplink transmission. As can be seen in FIG. 19, with a reduced GP of 2 symbols, the short TTI in WD2 far from the network node 40 can still be supported by scheduling this wireless device 20 at U2, and by using U1 as an extra guard period.

| Abbreviation | Explanation |
| --- | --- |
| BLER | Block Error Rate |
| DL | Downlink |
| FS | Frame Structure |
| LTE | Long Term Evolution |
| OFDM | Orthogonal Frequency Division Multiple Access |
| RE | Resource Element |
| RTT | Round Trip Time |
| SC-FDMA | Single Carrier-Frequency Division Multiple Access |
| SF | SubFrame |
| TTI | Transmission Time Interval |
| UL | uplink |

Some embodiments are as follows:

Embodiment 1

A method for use in a network node, such as a base station, in a wireless communication network, for transmitting communicating with information to at least one wireless device, the method comprising:
identifying a special subframe (optional);
transmitting, using at least one downlink short transmission time interval, TTI, within the special subframe, information to the at least one wireless device.

Embodiment 2

The method of Embodiment 1, wherein the number of downlink short TTIs are inserted into the special subframe to occupy at least in part, positions of the downlink part, DwPTS, of the special subframe.

Embodiment 3

The method of Embodiment 2, wherein a physical downlink control channel, PDCCH, is configured to be shorter than the DwPTS.

Embodiment 4

The method of Embodiment 1, wherein multiple switches between downlink and uplink are supported for short TTIs on a special SF.

Embodiment 5

The method of Embodiment 1, wherein a downlink short TTI crosses a border between a downlink part, DwPTS, and a first symbol of a guard period, GP.

Embodiment 6

A method for use in a wireless device, such as a user equipment, UE, for transmitting to a network node, the method comprising:
identifying a special subframe;
transmitting, using at least one uplink short transmission time interval, TTI, within the special subframe, information to the network node.

Embodiment 7

The method of Embodiment 6, wherein the number of uplink short TTIs are inserted into the special subframe to occupy at least in part, positions of the uplink part, UpPTS, of the special subframe.

Embodiment 8

The method of Embodiment 6, wherein an uplink short TTI crosses a border between an uplink part, UpPTS, and a last symbol of a guard period, GP.

Embodiment 9

The method of Embodiment 6, wherein part of the uplink part, UpPTS, in a time domain is used as a guard period, GP, for short TTI transmissions, where one of no wireless device is granted transmission of SRS and the uplink part is not allocated to a physical random access channel.

Embodiment 10

A method for transmission time interval, TTI, management for downlink/uplink switching in a time division duplex communication system, the method comprising:
identifying a special subframe; and
introducing multiple short TTIs into the special subframe, SF, during a guard period, GP, between a downlink part, DwPTS, of the subframe and an uplink part, UpPTS, of the subframe.

Embodiment 11

The method of Embodiment 10, wherein 2 downlink short TTIs are inserted into the GP and 4 uplink short TTIs are inserted into the GP of the special SF.

Embodiment 12

The method of Embodiment 10, wherein 1 downlink short TTI is inserted into the GP and 5 uplink short TTIs are inserted into the GP of the special SF.

Embodiment 13

The method of Embodiment 10, wherein 6 downlink short TTIs are inserted into the GP of the special SF.

Embodiment 14

The method of Embodiment 10, wherein 3 downlink short TTIs are inserted into the GP and 2 uplink short TTIs are inserted into the GP of the special SF.

Embodiment 15

The method of Embodiment 10, wherein the method is one of performed in a network node and for use in a network node.

Embodiment 16

A network node configured for transmission time interval, TTI, management when downlink/uplink switching occurs in legacy time division duplex communication systems, the network node comprising:
processing circuitry including a memory and a processor:
the memory configured to store a number of downlink TTIs and a number of uplink TTIs, to be inserted into a special subframe; and
the processor configured to introducing multiple TTIs in the special subframe, SF, during a guard period, GP, between a downlink part, DwPTS, of the subframe and an uplink part, UpPTS, of the subframe.

Embodiment 17

The network node of Embodiment 16, wherein 2 downlink short TTIs are inserted into the GP and 4 uplink short TTIs are inserted into the GP of the special SF.

Embodiment 18

The network node of Embodiment 16, wherein 1 downlink short TTI is inserted into the GP and 5 uplink short TTIs are inserted into the GP of the special SF.

Embodiment 19

The network node of Embodiment 16, wherein 6 downlink short TTIs are inserted into the GP of the special SF.

Embodiment 20

The network node of Embodiment 16, wherein 3 downlink short TTIs are inserted into the GP and 2 uplink short TTIs are inserted into the GP of the special SF.

Embodiment 21

A network node configured for transmission time interval, TTI, management when downlink/uplink switching occurs in legacy time division duplex communication systems, the network node comprising:

a memory module configured to store a number of TTIs and a number of uplink TTIs, to be inserted into a special subframe; and a short TTI determiner configured to introducing multiple TTIs in the special subframe, SF, during a guard period, GP, between a downlink part, DwPTS, of the subframe and an uplink part, UpPTS, of the subframe.

Thus, some embodiments advantageously provide a wireless device 20, network node 40 and method for communication between wireless devices 20 and network nodes 40. According to one aspect, a wireless device configured to communicate with a network node 40 in a wireless communication system is provided. The wireless device 20 includes processing circuitry 22 configured to obtain information regarding inclusion of at least one of an uplink, UL, signal and a downlink, DL, signal during at least one short transmission time interval, sTTI, in a special subframe of a radio frame to create an sTTI-containing special subframe. The wireless device 20 further includes a transceiver 34 configured to communicate with the network node 40 by one of sending the uplink signal and receiving the downlink signal during the at least one sTTI.

In some embodiments, the at least one sTTI is of two symbols duration. In some embodiments, the at least one sTTI at least partly occupies at least one symbol of a guard period, GP, of the special subframe. In some embodiments, the GP of the sTTI-containing special subframe occupies fewer symbols than a GP of a special subframe not having any sTTIs. In some embodiments, the at least one sTTI occurs in one of: symbols covering both a downlink part, DwPTS, and a guard period, GP, of the special subframe; and symbols covering both a GP and an uplink part, UpPTS, of the special subframe. In some embodiments, at least one symbol of a downlink part, DwPTS, of the special subframe is used as a guard period, GP, for the sTTI-containing special subframe and at least one UL sTTI occupies at least one symbol of a GP of the special subframe. In some embodiments, a physical downlink control channel, PDCCH is configured to be of shorter duration than the duration of the DwPTS. In some embodiments, at least one symbol of an uplink part, UpPTS, in the special subframe is used as a guard period, GP, in the sTTI-containing subframe and at least one DL sTTI occupies at least one symbol of the GP of the special subframe. In some embodiments, no wireless device is granted transmission of sounding reference signals, SRS, and no physical random access channel, PRACH, is allocated in the special subframe. In some embodiments, multiple switches between UL and DL are supported for sTTIs in the sTTI-containing special subframe. In some embodiments, the special subframe has a downlink part, DwPTS, of at least three symbols duration, a guard period of at least nine symbols duration, and an uplink part, UpPTS, of at least one symbol duration. In some embodiments, the special subframe has a downlink part, DwPTS, of at least eight symbols duration, a guard period of at least three symbols duration, and an uplink part, UpPTS, of at least one symbol duration. In some embodiments, downlink signaling occurs first in the sTTI-containing special subframe followed by a guard period followed by uplink signaling in the sTTI-containing special subframe. In some embodiments, the special subframe has a duration of 14 symbols, no more than four of the 14 symbols being a duration of a guard period, GP, the GP following a downlink sTTI and preceding an uplink sTTI. In some embodiments, the processing circuitry 22 is further configured to form the special subframe having the at least one sTTI based on scheduling information received from the network node 40.

In some embodiments, a method for use in a wireless device 20 in a wireless communication network for communicating with at least one network node 40 is provided. The method includes obtaining information regarding inclusion of at least one of an uplink, UL, signal and a downlink, DL, signal to occur during at least one short transmission time interval, sTTI, in a special subframe of a radio frame to create an sTTI-containing special subframe (S100). The method also includes communicating with the network node by one of sending the uplink signal and receiving the downlink signal during the at least one sTTI (S102).

In some embodiments, the at least one sTTI is of two symbols duration. In some embodiments, the at least one sTTI at least partly occupies at least one symbol of a guard period, GP, of the special subframe. In some embodiments, the GP of the sTTI-containing special subframe occupies fewer symbols than a GP of a special subframe not having any sTTIs. In some embodiments, the at least one sTTI occurs in one of: symbols covering both a downlink part, DwPTS, and a guard period, GP, of the special subframe; and symbols covering both the GP and an uplink part, UpPTS, of the special subframe. In some embodiments, at least one symbol of a downlink part, DwPTS, of the special subframe is used as a guard period, GP, for the sTTI-containing special subframe and at least one UL sTTI occupies at least one symbol of a GP of the special subframe. In some embodiments, a physical downlink control channel, PDCCH is configured to be of shorter duration than the duration of the DwPTS. In some embodiments, at least one symbol of the UpPTS in the special subframe is used as a guard period, GP, in the sTTI-containing subframe and at least one DL sTTI occupies at least one symbol of the GP of the special subframe. In some embodiments, no wireless device is granted transmission of sounding reference signals, SRS, and no physical random access channel, PRACH, is allocated in the special subframe. In some embodiments, multiple switches between UL and DL are supported for sTTIs in the sTTI-containing special subframe. In some embodiments, the special subframe has a downlink part, DwPTS, of at least three symbols duration, a guard period of at least nine symbols duration, and an uplink part, UpPTS, of at least one symbol duration. In some embodiments, the special subframe has a downlink part, DwPTS, of at least eight symbols duration, a guard period of at least three symbols duration, and an uplink part, UpPTS, of at least one symbol duration. In some embodiments, downlink signaling occurs first in the sTTI-containing special subframe followed by a guard period followed by uplink signaling in the sTTI-containing special subframe. In some embodiments, the special subframe has a duration of 14 symbols, no more than four of the 14 symbols being a duration of a guard period, GP, the GP following a downlink sTTI and preceding an uplink sTTI. In some embodiments, the method further includes forming the special subframe having the at least one sTTI based on scheduling information received from the network node 40.

In some embodiments, a wireless device 20 configured to communicate with a network node 40 in a wireless communication system is provided. The wireless device 20 includes a special subframe module 31 configured to obtain information regarding inclusion of at least one of forming an uplink, UL, signal and forming a downlink, DL, signal during at least one short transmission time interval, sTTI, in a special subframe of a radio frame to create an sTTI-containing special subframe. The wireless device 20 also includes a transceiver module 35 configured to communicate with the network node by one of sending the uplink signal and receiving the downlink signal during the at least one sTTI.

In some embodiments, a network node 40 in a wireless communication network for communicating with at least one wireless device 20 is provided. The network node 40 includes processing circuitry 42 configured to schedule at least one of uplink, UL, transmissions and downlink, DL, transmissions during at least one short transmission time interval, sTTI, in a special subframe of a radio frame to create an sTTI-containing special subframe. The network node 40 also includes a transceiver 54 configured to communicate with the at least one wireless device 20 during the scheduled at least one sTTI.

In some embodiments, the at least one sTTI is of two symbols duration. In some embodiments, the at least one sTTI at least partly occupies at least one symbol of a guard period, GP, of the special subframe. In some embodiments, the sTTI-containing special subframe includes a guard period, GP, and the GP of the sTTI-containing special subframe occupies fewer symbols than a GP of a special subframe not having any sTTIs. In some embodiments, the at least one sTTI is scheduled in one of: time symbols covering both a downlink part, DwPTS, and a guard period, GP, of the special subframe; and time symbols covering both a GP and an uplink part, UpPTS, of the special subframe. In some embodiments, at least one symbol of a DwPTS of the special subframe is used as a guard period, GP, for the sTTI-containing special subframe and at least one UL sTTI is scheduled in at least one symbol of a GP of the special subframe. In some embodiments, the physical downlink control channel, PDCCH is configured to be of shorter duration than the duration of the DwPTS. In some embodiments, at least one time symbol of the UpPTS in the special subframe is used as a guard period, GP, in the sTTI-containing subframe and at least one DL sTTI is scheduled in at least one symbol of the GP of the special subframe. In some embodiments, no wireless device is granted transmission of sounding reference signals, SRS, and no physical random access channel, PRACH, is allocated in the special subframe. In some embodiments, multiple switches between UL and DL are supported for sTTIs in the sTTI-containing special subframe. In some embodiments, the special subframe has a downlink part, DwPTS, of at least three symbols duration, a guard period of at least nine symbols duration, and an uplink part, UpPTS, of at least one symbol duration. In some embodiments, the special subframe has a downlink part, DwPTS, of at least eight symbols duration, a guard period of at least three symbols duration, and an uplink part, UpPTS, of at least one symbol duration. In some embodiments, downlink signaling occurs first in the sTTI-containing special subframe followed by a guard period followed by uplink signaling in the sTTI-containing special subframe. In some embodiments, the sTTI-containing special subframe is configured for scheduling communication with a first wireless device while a special subframe without sTTIs is configured for scheduling communication with a second wireless device. In some embodiments, the special subframe has a duration of 14 symbols, no more than four of the 14 symbols being a duration of a guard period, GP, the GP following a downlink sTTI and preceding an uplink sTTI.

In some embodiments, a method for use in a network node 40 in a wireless communication network for communicating with at least one wireless device 20 is provided. The method includes scheduling at least one of uplink, UL, transmissions and downlink, DL, transmissions during at least one short transmission time interval, sTTI, in a special subframe of a radio frame to create an sTTI-containing special subframe (S104). The method also includes communicating with the at least one wireless device 20 during the scheduled at least one sTTI (S106).

In some embodiments, the at least one sTTI is of two symbols duration. In some embodiments, the at least one sTTI at least partly occupies at least one symbol of a guard period, GP, of the special subframe. In some embodiments, the sTTI-containing special includes a guard period, GP, and the GP of the sTTI-containing special subframe occupies fewer symbols than a GP of a special subframe not having any sTTIs. In some embodiments, the at least one sTTI is scheduled in one of: time symbols covering both a downlink part, DwPTS, and a guard period, GP, of the special subframe; and time symbols covering both a GP and an uplink part, UpPTS, of the special subframe. In some embodiments, at least one symbol of a DwPTS of the special subframe is used as a guard period, GP, for the sTTI-containing special subframe and at least one UL sTTI is scheduled in at least one symbol of a GP of the special subframe. In some embodiments, a physical downlink control channel, PDCCH is configured to be of shorter duration than the duration of the DwPTS. In some embodiments, at least one symbol of the UpPTS in the special subframe is used as a guard period, GP, in the sTTI-containing subframe and at least one DL sTTI is scheduled in at least one symbol of the GP of the special subframe. In some embodiments, no wireless device is granted transmission of sounding reference signals, SRS, and no physical random access channel, PRACH, is allocated in the special subframe. In some embodiments, multiple switches between UL and DL are supported for sTTIs in the sTTI-containing special subframe. In some embodiments, the special subframe has a downlink part, DwPTS, of at least three symbols duration, a guard period of at least nine symbols duration, and an uplink part, UpPTS, of at least one symbol duration. In some embodiments, the special subframe has a downlink part, DwPTS, of at least eight symbols duration, a guard period of at least three symbols duration, and an uplink part, UpPTS, of at least one symbol duration. In some embodiments, downlink signaling occurs first in the sTTI-containing special subframe followed by a guard period followed by uplink signaling in the sTTI-containing special subframe. In some embodiments, the sTTI-containing special subframe is configured for scheduling communication with a first wireless device while a special subframe without sTTIs is configured for scheduling communication with a second wireless device. In some embodiments, the special subframe has a duration of 14 symbols, no more than four of the 14 symbols being a duration of a guard period, GP, the GP following a downlink sTTI and preceding an uplink sTTI.

In some embodiments, a network node 40 in a wireless communication network for communicating with at least one wireless device 20 is provided. The network node includes a special subframe scheduling module 51 configured to schedule at least one of uplink, UL, transmissions and downlink, DL, transmissions during at least one short transmission time interval, sTTI, in a special subframe of a radio frame to create an sTTI-containing special subframe. The network node 40 also includes a transceiver module 55 configured to communicate with the at least one wireless device during the scheduled at least one sTTI.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device in communication with a network node in a wireless communication system, the wireless device comprising:
processing circuitry to obtain information regarding inclusion of at least one of an uplink, UL, signal and a downlink, DL, signal during at least one short transmission time interval, sTTI, in a special subframe of a radio frame to create an sTTI-containing special subframe, wherein the special subframe has a downlink part, DwPTS, of at least three symbols duration, a guard period of at least nine symbols duration, and an uplink part, UpPTS, of at least one symbol duration and wherein the sTTI has a duration less than a duration of the special subframe, wherein the at least one sTTI occurs in one of symbols covering both a downlink part (DwPTS) and a guard period (GP) of the special subframe and symbols covering both a GP and an uplink part (UpPTS) of the special subframe; and
a transceiver to communicate with the network node by one of sending the uplink signal and receiving the downlink signal during the at least one sTTI.

2. The wireless device of claim 1, wherein the at least one sTTI is of two symbols duration.

3. The wireless device of claim 1, wherein the at least one sTTI at least partly occupies at least one symbol of a guard period, GP, of the special subframe.

4. The wireless device of claim 3, wherein the GP of the sTTI-containing special subframe occupies fewer symbols than a GP of a special subframe not having any sTTIs.

5. The wireless device of claim 1, wherein at least one symbol of a downlink part, DwPTS, of the special subframe is used as a guard period, GP, for the sTTI-containing special subframe and at least one UL sTTI occupies at least one symbol of a GP of the special subframe.

6. The wireless device of claim 5, wherein a physical downlink control channel, PDCCH is of shorter duration than the duration of the DwPTS.

7. The wireless device of claim 1, wherein at least one symbol of an uplink part, UpPTS, in the special subframe is used as a guard period, GP, in the sTTI-containing subframe and at least one DL sTTI occupies at least one symbol of the GP of the special subframe.

8. The wireless device of claim 1, wherein no wireless device is granted transmission of sounding reference signals, SRS, and no physical random access channel, PRACH, is allocated in the special subframe.

9. The wireless device of claim 1, wherein multiple switches between UL and DL are supported for sTTIs in the sTTI-containing special subframe.

10. The wireless device of claim 1, wherein the special subframe has a downlink part, DwPTS, of at least eight symbols duration, a guard period of at least three symbols duration, and an uplink part, UpPTS, of at least one symbol duration.

11. The wireless device of claim 1, wherein downlink signaling occurs first in the sTTI-containing special subframe followed by a guard period followed by uplink signaling in the sTTI-containing special subframe.

12. The wireless device of claim 1, wherein the special subframe has a duration of 14 symbols, no more than four of the 14 symbols being a duration of a guard period, GP, the GP following a downlink sTTI and preceding an uplink sTTI.

13. The wireless device of claim 1, wherein the processing circuitry further forms the special subframe having the at least one sTTI based on scheduling information received from the network node.

14. A method for use in a wireless device in a wireless communication network for communicating with at least one network node, the method comprising:
    obtaining information regarding inclusion of at least one of an uplink, UL, signal and a downlink, DL, signal to occur during at least one short transmission time interval, sTTI, in a special subframe of a radio frame to create an sTTI-containing special subframe, wherein the special subframe has a downlink part, DwPTS, of at least three symbols duration, a guard period of at least nine symbols duration, and an uplink part, UpPTS, of at least one symbol duration and wherein the sTTI has a duration less than a duration of the special subframe, wherein the at least one sTTI occurs in one of symbols covering both a downlink part (DwPTS) and a guard period (GP) of the special subframe and symbols covering both the GP and an uplink part (UpPTS) of the special subframe; and
    communicating with the network node by one of sending the uplink signal and receiving the downlink signal during the at least one sTTI.

15. The method of claim 14, wherein the at least one sTTI is of two symbols duration.

16. The method of claim 14, wherein the at least one sTTI at least partly occupies at least one symbol of a guard period, GP, of the special subframe.

17. The method of claim 16, wherein the GP of the sTTI-containing special subframe occupies fewer symbols than a GP of a special subframe not having any sTTIs.

18. The method of claim 14, wherein at least one symbol of a downlink part, DwPTS, of the special subframe is used as a guard period, GP, for the sTTI-containing special subframe and at least one UL sTTI occupies at least one symbol of a GP of the special subframe.

19. The method of claim 18, wherein a physical downlink control channel, PDCCH is of shorter duration than the duration of the DwPTS.

20. The method of claim 14, wherein at least one symbol of the UpPTS in the special subframe is used as a guard period, GP, in the sTTI-containing subframe and at least one DL sTTI occupies at least one symbol of the GP of the special subframe.

21. The method of claim 14, wherein no wireless device is granted transmission of sounding reference signals, SRS, and no physical random access channel, PRACH, is allocated in the special subframe.

22. The method of any claim 14, wherein multiple switches between UL and DL are supported for sTTIs in the sTTI-containing special subframe.

23. The method of claim 14, wherein the special subframe has a downlink part, DwPTS, of at least eight symbols duration, a guard period of at least three symbols duration, and an uplink part, UpPTS, of at least one symbol duration.

24. The method of claim 14, wherein downlink signaling occurs first in the sTTI-containing special subframe followed by a guard period followed by uplink signaling in the sTTI-containing special subframe.

25. The method of claim 14, wherein the special subframe has a duration of 14 symbols, no more than four of the 14 symbols being a duration of a guard period, GP, the GP following a downlink sTTI and preceding an uplink sTTI.

26. The method of claim 14, further comprising forming the special subframe having the at least one sTTI based on scheduling information received from the network node.

27. A network node in a wireless communication network for communicating with at least one wireless device, the network node comprising:
    processing circuitry to schedule at least one of uplink, UL, transmissions and downlink, DL, transmissions during at least one short transmission time interval, sTTI, in a special subframe of a radio frame to create an sTTI-containing special subframe, wherein the special subframe has a downlink part, DwPTS, of at least three symbols duration, a guard period of at least nine symbols duration, and an uplink part, UpPTS, of at least one symbol duration and wherein the sTTI has a duration less than a duration of the special subframe, wherein the at least one sTTI occurs in one of symbols covering both a downlink part (DwPTS) and a guard period (GP) of the special subframe and symbols covering both the GP and an uplink part (UpPTS) of the special subframe; and
    a transceiver to communicate with the at least one wireless device during the scheduled at least one sTTI.

28. The network node of claim 27, wherein the sTTI-containing special subframe schedules communication with a first wireless device while a special subframe without sTTIs is configured for scheduling communication with a second wireless device.

29. A method for use in a network node in a wireless communication network for communicating with at least one wireless device, the method comprising:
    scheduling at least one of uplink, UL, transmissions and downlink, DL, transmissions during at least one short transmission time interval, sTTI, in a special subframe of a radio frame to create an sTTI-containing special subframe, wherein the special subframe has a downlink part, DwPTS, of at least three symbols duration, a guard period of at least nine symbols duration, and an uplink part, UpPTS, of at least one symbol duration and wherein the sTTI has a duration less than a duration of the special subframe, wherein the at least one sTTI occurs in one of symbols covering both a downlink part (DwPTS) and a guard period (GP) of the special subframe and symbols covering both the GP and an uplink part (UpPTS) of the special subframe; and
communicating with the at least one wireless device during the scheduled at least one sTTI.

* * * * *